United States Patent
Ikeda et al.

(10) Patent No.: US 9,470,553 B2
(45) Date of Patent: Oct. 18, 2016

(54) ROTATION ANGLE DETECTION APPARATUS

(71) Applicant: AISAN KOGYO KABUSHIKI KAISHA, Obu-shi, Aichi (JP)

(72) Inventors: Tsutomu Ikeda, Tokoname (JP); Tetsuo Suzuoki, Obu (JP); Junpei Hayashi, Obu (JP); Akihito Kuno, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 63 days.

(21) Appl. No.: 14/687,311

(22) Filed: Apr. 15, 2015

(65) Prior Publication Data

US 2015/0338241 A1 Nov. 26, 2015

(30) Foreign Application Priority Data

May 20, 2014 (JP) .................. 2014-104691

(51) Int. Cl.
| | |
|---|---|
| *G01B 7/14* | (2006.01) |
| *G01B 7/30* | (2006.01) |
| *G01D 5/14* | (2006.01) |
| *F02D 41/00* | (2006.01) |
| *H02K 7/116* | (2006.01) |
| *G01D 5/04* | (2006.01) |
| *G01P 3/487* | (2006.01) |

(52) U.S. Cl.
CPC .............. *G01D 5/14* (2013.01); *F02D 41/009* (2013.01); *G01D 5/04* (2013.01); *G01D 5/145* (2013.01); *H02K 7/116* (2013.01); *H02K 11/215* (2016.01); *G01P 3/487* (2013.01)

(58) Field of Classification Search
CPC ........................................................ G01D 5/14
USPC ........................................ 324/207.11, 207.22
See application file for complete search history.

(56) References Cited

U.S. PATENT DOCUMENTS

| | | | |
|---|---|---|---|
| 7,042,212 B2* | 5/2006 | Yoshikawa | G01D 11/245 324/207.25 |
| 7,800,358 B2* | 9/2010 | Akiyama | F02D 11/106 324/207.2 |
| 8,450,999 B2* | 5/2013 | Wolschlager | G01D 1/00 324/207.25 |

FOREIGN PATENT DOCUMENTS

| | | |
|---|---|---|
| JP | H05-011753 U | 2/1993 |
| JP | 2011-017598 A | 1/2011 |

* cited by examiner

*Primary Examiner* — Reena Aurora
(74) *Attorney, Agent, or Firm* — Oliff PLC

(57) ABSTRACT

Rotation angle detection apparatus includes a magnet provided in a main gear and a magnetism detector positioned to face to the magnet. Magnet rotates integrally with main gear and magnetism detector detects changes in magnetic field of magnet so a rotation angle of main gear is detected. Main gear includes bottomed recessed part and plurality of mounting pins arranged in recessed part. Magnet is inserted in recessed part wherein a part of magnet protrudes from an upper end of the recessed part. Magnet inserted in recessed part is pressed against main gear by an elastically deformable retaining plate made of non-magnetic material. An outer portion of retaining plate includes plurality of mounting holes. Magnet inserted in recessed part is pressed against main gear by elastically deformed retaining plate and mounting pins inserted in mounting holes are thermally caulked wherein magnet is secured to the main gear.

14 Claims, 29 Drawing Sheets

ROTATION ANGLE DETECTION APPARATUS

CROSS-REFERENCE TO RELATED APPLICATIONS

This application is based upon and claims the benefit of priority from the prior Japanese Patent Application No. 2014-104691 filed on May 20, 2014, the entire contents of which are incorporated herein by reference.

BACKGROUND OF THE INVENTION

1. Field of the Invention

The present invention relates to a rotation angle detection apparatus configured to detect a rotation angle of a rotor.

2. Related Art

Heretofore, for this type of technique, for example, a movement detection apparatus disclosed in JP-A-2011-17598 has been known. FIG. 35 is a cross sectional view of this apparatus. The apparatus includes a moving part 71, a magnet 72 which will move with the moving part 71, a magnetism detector 74 arranged in a housing 73 to detect leakage magnetic field leaking from the magnet 72, a sliding holder 76 configured to retain the magnet 72 and to slide on a guide surface 75 provided in the housing 73, and a connection member 77 positioned in between the moving part 71 and the sliding holder 76 to press the sliding holder 76 toward the guide surface 75. The connection member 77 is provided with holding parts 78 holding the sliding holder 76 from both sides of the holder 76, the both sides opposite each other in a sliding direction. The connection member 77 is made of non-magnetic material for spring. The magnet 72 is pressed toward the sliding holder 76 by a supplementary press piece (not shown) formed in the connection member 77. The sliding holder 76 includes positioning projections 79 inserted in support holes (not shown) of the connection member 77 and the positioning projections 79 are thermally caulked so that the sliding holder 76 is secured to the connection member 77. The sliding holder 76, the magnet 72, and the connection member 77 are integrally assembled to complete an assembly body and thus the movement detection apparatus is configured. This Japanese Application Publication JP-A-2011-17598 discloses the technique of retaining the magnet 72 without wobbling in an axial direction.

SUMMARY OF INVENTION

Problems to be Solved by the Invention

However, in the apparatus disclosed in JP-A-2011-17598, the connection member 77 has only a force to press the magnet 72 in the axial direction. Therefore, in order to restrict the magnet 72 from moving in a direction orthogonal to the axial direction, the magnet 72 needs to be press-fitted in the sliding holder 76, requiring a complicated structure of the sliding holder 76, that is difficult to manufacture.

The present invention has been made in view of the above circumstances and has a purpose to provide a rotation angle detection apparatus with a simple structure, the apparatus being capable of retaining a magnet with respect to a rotor which retains the magnet without wobbling in an axial direction and in a radial direction.

Means of Solving the Problems

To achieve the above purpose, one aspect of the invention provides a rotation angle detection apparatus provided with: a rotor; a magnet retained in the rotor; and a magnetism detector positioned to face to the magnet, the rotation angle detection apparatus being configured to detect a rotation angle of the rotor in such a way that the magnet rotates integrally with the rotor and the magnetism detector detects changes in magnetic field of the magnet, wherein the rotor includes a bottomed recessed part and a plurality of mounting pins arranged in the recessed part, the magnet is inserted in the recessed part such that a part of the magnet protrudes from an upper end of the recessed part, the rotation angle detection apparatus includes an elastically deformable retaining plate made of non-magnetic material configured to press and hold the magnet inserted in the recessed part to the rotor, the retaining plate includes a center portion and an outer portion, the outer portion including a plurality of mounting holes in each of which the mounting pins are inserted, and the magnet inserted in the recessed part is pressed at an outer peripheral edge against the rotor by the elastically deformed retaining plate and each of the mounting pins inserted one in each of the mounting holes is thermally caulked so that the magnet is secured to the rotor.

Effects of the Invention

According to the present invention, with respect to a rotor retaining a magnet, the magnet can be retained without wobbling in an axial direction and in a radial direction with a simple structure.

DESCRIPTION OF EMBODIMENTS

First Embodiment

A detailed description of a first embodiment of a rotation angle detection apparatus of the present invention embodied as an exhaust gas recirculation valve (EGR valve) provided with a double offset valve will now be given referring to the accompanying drawings.

Figure 1:
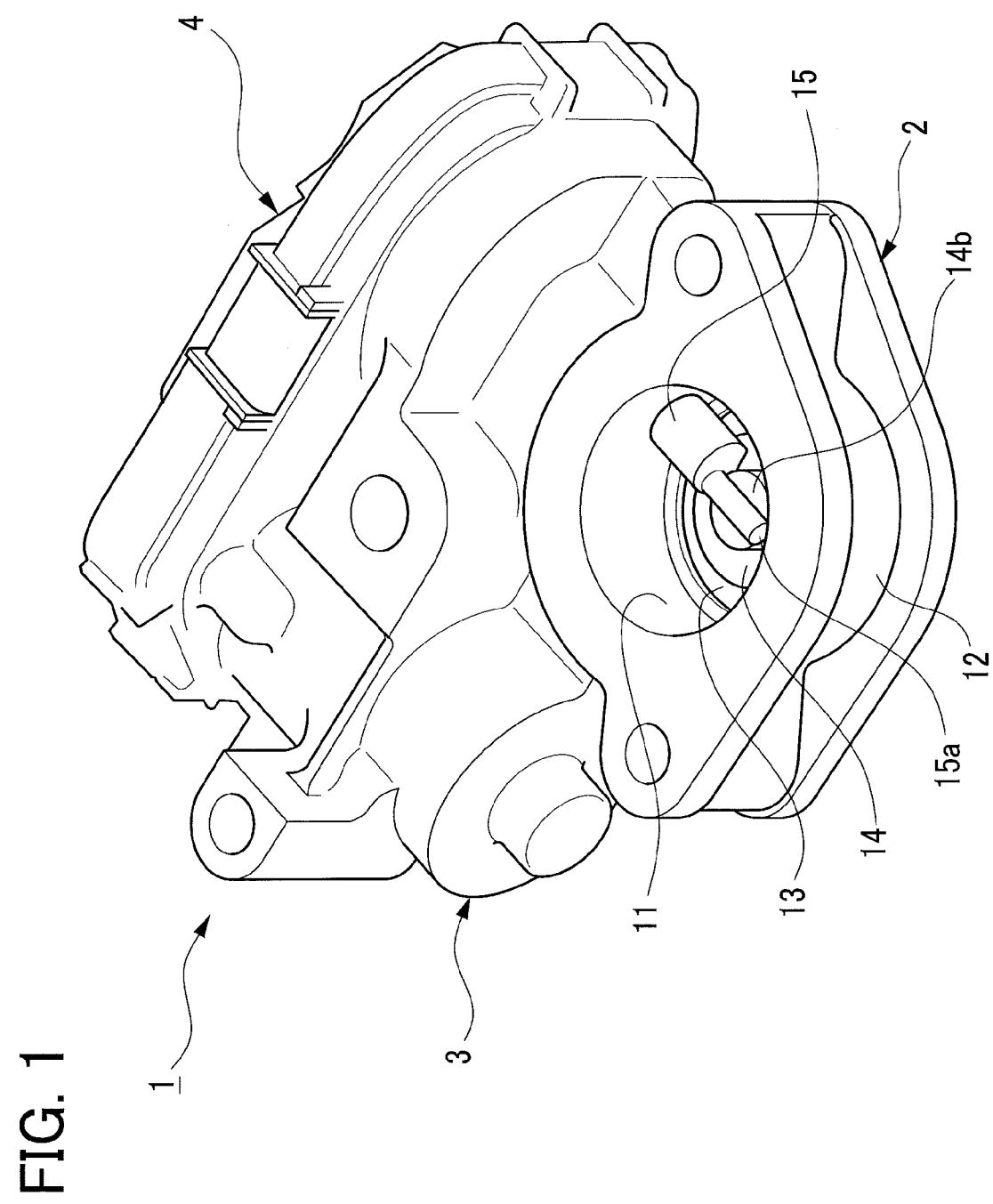
FIG. 1 is a perspective view showing an electrically-operated EGR valve provided with a double offset valve in a first embodiment.

FIG. 1 is a perspective view showing an electrically-operated EGR valve 1 provided with a double offset valve. This EGR valve 1 includes a valve part 2 configured as the double offset valve, a motor part 3 internally provided with a motor 32 (see FIG. 4), and a reduction mechanism part 4 internally provided with a plurality of gears 41 to 43 (see FIGS. 4 and 5). The valve part 2 includes a pipe 12 having a passage 11 in which EGR gas as a fluid flows. In this passage 11, a valve seat 13, a valve element 14, and a rotary shaft 15 are arranged. The rotary shaft 15 is configured to receive torque of the motor 32 (see FIG. 4) via the plurality of gears 41 to 43 (see FIGS. 4 and 5).

Figure 2:
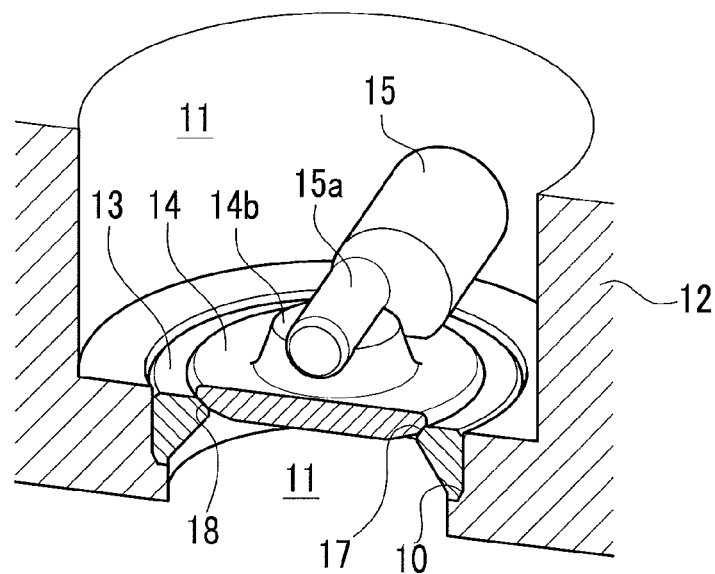
FIG. 2 is a partially broken perspective view showing a valve part in a valve full-closed state that a valve element seats on a valve seat in the first embodiment.
Figure 3:
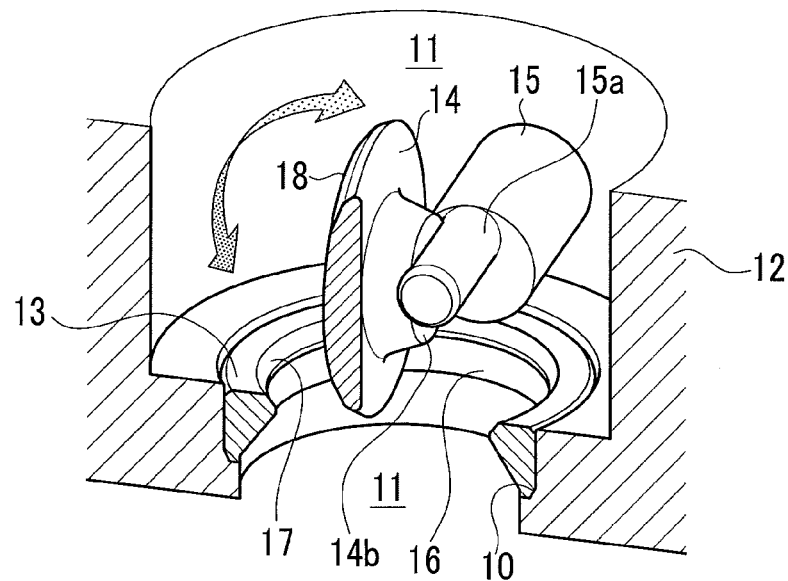
FIG. 3 is a partially broken perspective view showing the valve part in a valve full-opened state that the valve element is separated most from the valve seat in the first embodiment.

FIG. 2 is a partially broken perspective view of the valve part 2 in a valve fully-closed state that the valve element 14 seats on the valve seat 13. FIG. 3 is a partially broken perspective view of the valve part 2 in a valve fully-opened state that the valve element 14 is separated most from the valve seat 13. As shown in FIGS. 2 and 3, the passage 11 is formed with a step portion 10 in which the valve seat 13 is fitted. The valve seat 13 is formed in a circularly annular shape and formed in its center with a valve hole 16. A peripheral portion of the valve hole 16 is formed with an annular seat surface 17. The valve element 14 formed in a disc-like shape is formed on its outer circumference with an annular sealing surface 18 corresponding to the seat surface 17. The valve element 14 is fixed to the rotary shaft 15 so that the valve element 14 rotates integrally with the rotary shaft 15. In FIGS. 2 and 3, the passage 11 directly above the valve element 14 indicates an upstream side of the EGR gas flow, and the passage 11 directly below the valve seat 13 indicates a downstream side of the EGR gas flow. Namely, the valve element 14 is located upstream of the EGR gas flow than the valve seat 13 in the passage 11.

Figure 4:
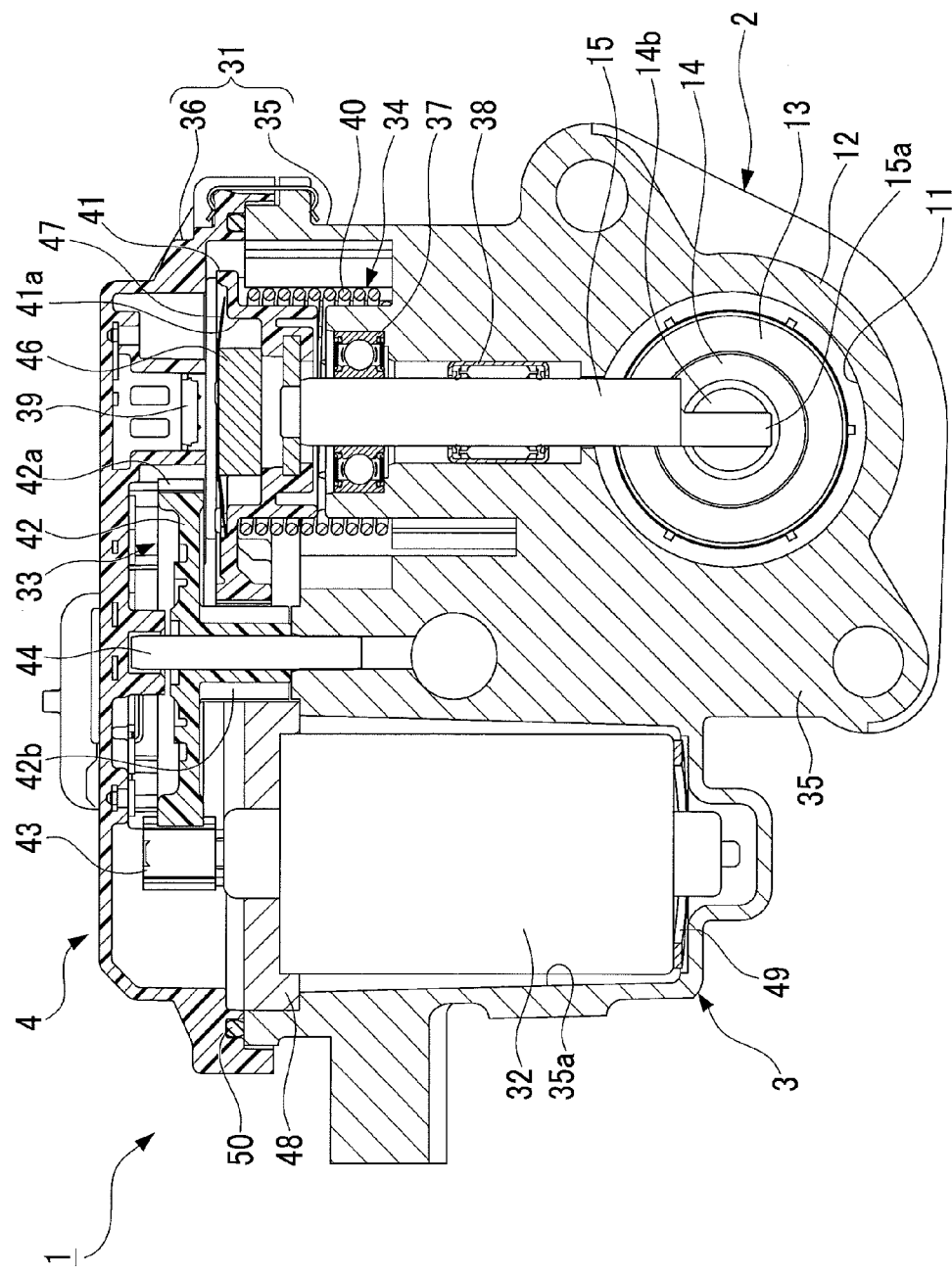
FIG. 4 is a plan sectional view showing the EGR valve in the first embodiment.

FIG. 4 is a plan sectional view of the EGR valve 1. The EGR valve 1 includes main elements of, as well as the rotary shaft 15 and the valve element 14, an EGR body 31, the motor 32, a reduction mechanism 33, and an opener mechanism 34.

In the present embodiment, the EGR body 31 includes an aluminum-made valve housing 35, including the passage 11 and the pipe 12, and a synthetic-resin-made end frame 36 closing an opening end of the valve housing 35. The rotary shaft 15 and the valve element 14 are provided in the valve housing 35. The rotary shaft 15 includes a pin 15a protruding from a distal end of the shaft 15. A distal end side of the rotary shaft 15 where the pin 15a is provided is a free end, and this distal end is inserted and positioned in the passage 11 of the pipe 12. Further, the rotary shaft 15 is cantilevered in a rotatable manner with respect to the valve housing 35 via two bearings of a first bearing 37 and a second bearing 38 which are arranged apart from each other on a proximal end side of the rotary shaft 15. The first bearing 37 consists of a ball bearing and the second bearing 38 consists of a needle bearing. The valve element 14 is fixed to the pin 15a formed on the distal end of the rotary shaft 15 by welding an extending portion 14b and arranged in the passage 11.

Figure 5:
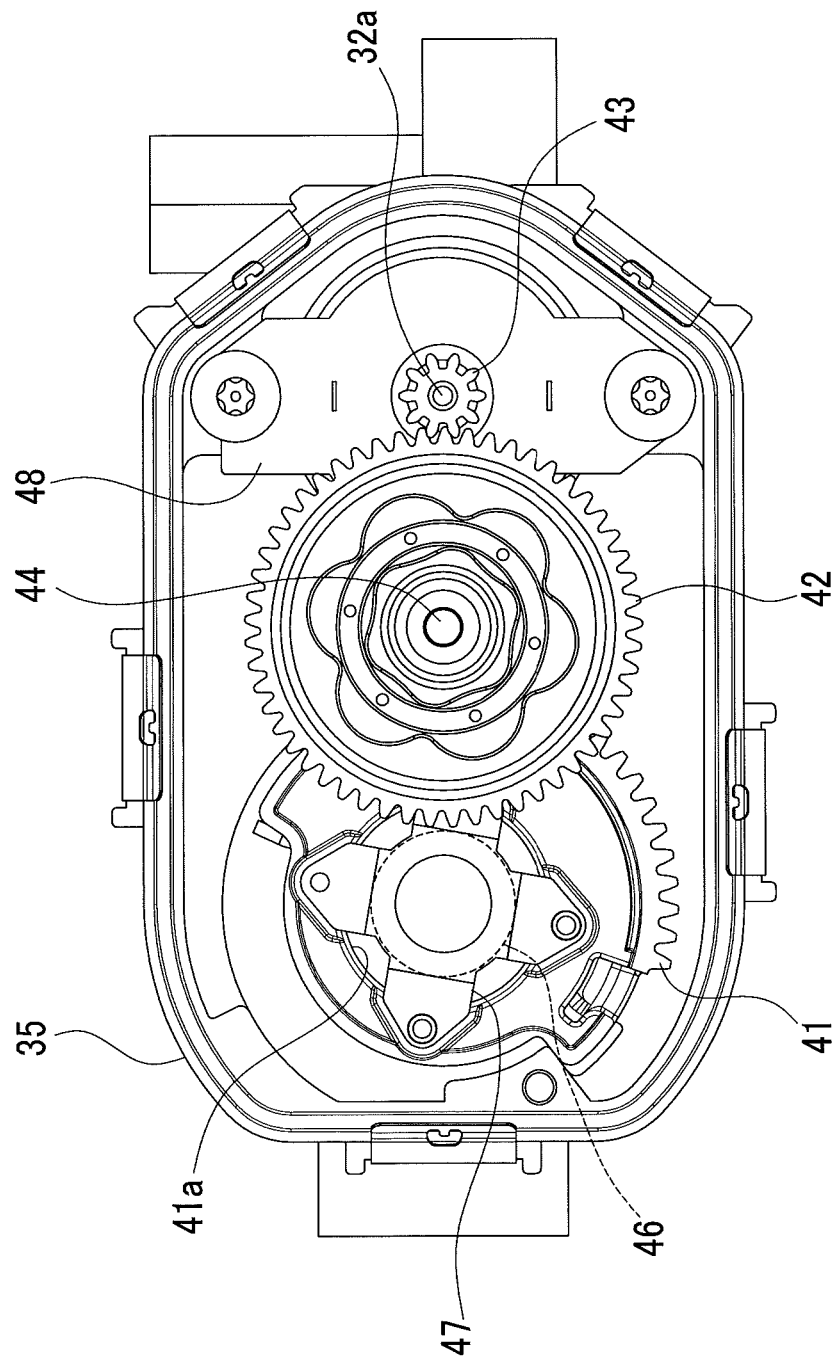
FIG. 5 is a rear view showing a state that an end frame is removed from a valve housing in the first embodiment.
Figure 6:
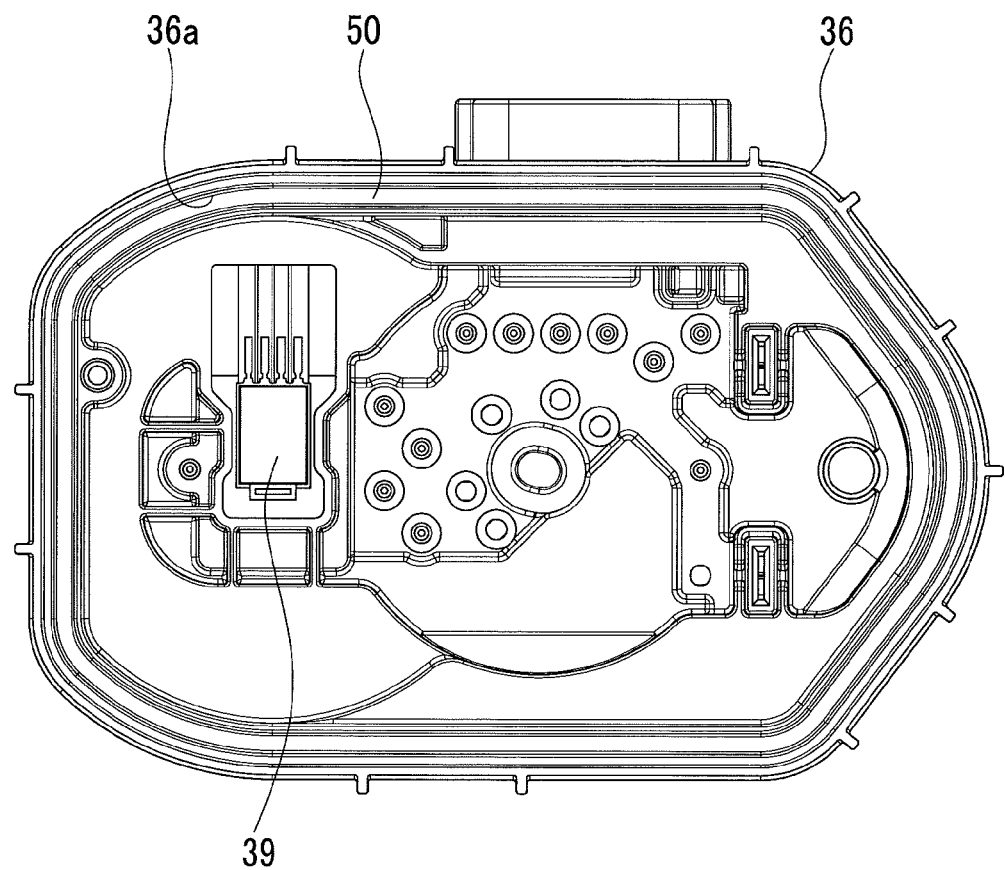
FIG. 6 is a front view showing an inside part of the end frame in the first embodiment.

FIG. 5 is a rear view of the valve housing 35 in a state that the end frame 36 is removed. FIG. 6 is a front view of an inside part of the end frame 36. The end frame 36 is fixed to the valve housing 35 by a plurality of rivets or clips (not shown). As shown in FIGS. 4 and 6, an EGR opening-degree sensor 39 is provided inside the end frame 36 in correspondence with the proximal end of the rotary shaft 15 and used for detecting an opening degree of the valve element 14 (EGR opening degree). This sensor 39 is configured by an MR-IC, a hall-IC, or the like, to detect a rotation angle of the rotary shaft 15 as the EGR opening degree. As shown in FIGS. 4 and 5, a main gear 41 made of a fan-shaped gear is fixed to the proximal end of the rotary shaft 15. A return spring 40 is provided in between the main gear 41 and the valve housing 35 to urge the valve element 14 in a valve-closing direction. The return spring 40 is one of elements constituting the opener mechanism 34. A bottomed recessed part 41a is formed on a rear side of the main gear 41 to accommodate an almost disc-like shaped magnet 46. The magnet 46 is pressed and fixed by a retaining plate 47. Accordingly, when the main gear 41 is rotated integrally with the valve element 14 and the rotary shaft 15, the magnet 46 also rotates, thereby changing a magnetic field. Then, the EGR opening-degree sensor 39 detects the changes in the magnetic field of the magnet 46, and thereby the rotation angle of the main gear 41 is detected as the rotation angle of the valve element 14, i.e., the EGR opening degree. In the present embodiment, the main gear 41 corresponds to one example of a rotor of the invention, and the EGR opening-degree sensor 39 corresponds to one example of a magnetism detector of the invention. Further, the rotation angle detection apparatus of the present invention consists of the main gear 41, the magnet 46, and the EGR opening-degree sensor 39.

In the present embodiment, the motor 32 is accommodated and fixed in an accommodation chamber 35a formed in the valve housing 35. To be specific, the motor 32 accommodated in the accommodation chamber 35a is fixed to the valve housing 35 via a holding plate 48 and a plate spring 49 provided on both ends of the chamber 35a. The motor 32 is drivingly connected to the rotary shaft 15 via the reduction mechanism 33 for driving the valve element 14 to open and close. On an output shaft 32a of the motor 32, a motor gear 43 is mounted. This motor gear 43 is drivingly connected to the main gear 41 via an intermediate gear 42. The intermediate gear 42 is a two-step gear including a large-diameter gear 42a and a small-diameter gear 42b and is rotatably supported in the valve housing 35 via a pin shaft 44. The large-diameter gear 42a engages with the motor gear 43 and the small-diameter gear 42b engages with the main gear 41. In the present embodiment, as each of the gears 41 to 43 configuring the reduction mechanism 33, resin gears made of resin material are adopted for weight reduction.

As shown in FIG. 4, a rubber-made gasket 50 is provided between the valve housing 35 and the end frame 36. The gasket 50 is placed in a circumferential groove 36a formed on an outer circumference in an open end face of the end frame 36 as shown in FIG. 6. In this manner, the gasket 50 is interposed between the valve housing 35 and the end frame 36, and thereby the inside of the motor part 3 and the reduction mechanism part 4 is hermetically closed from an atmosphere.

Accordingly, as shown in FIG. 2, in the valve fully-closed state of the valve element 14, the motor 32 is energized and operated to rotate the output shaft 32a in a forward direction and the motor gear 43 is rotated accordingly. The rotation of the motor gear 43 is reduced by the intermediate gear 42 and transmitted to the main gear 41. Thereby, the rotary shaft 15 and the valve element 14 are rotated against urging force of the return spring 40 to open the passage 11. Namely, the valve element 14 is opened. In order to keep a certain opening degree of the valve element 14, the motor 32 is energized to generate a torque and the torque as a retaining force is transmitted to the rotary shaft 15 and to the valve element 14 via the motor gear 43, the intermediate gear 42, and the main gear 41. This retaining force is balanced with the urging force of the return spring 40 so that the opening degree of the valve element 14 is maintained to a certain degree.

Figure 7:
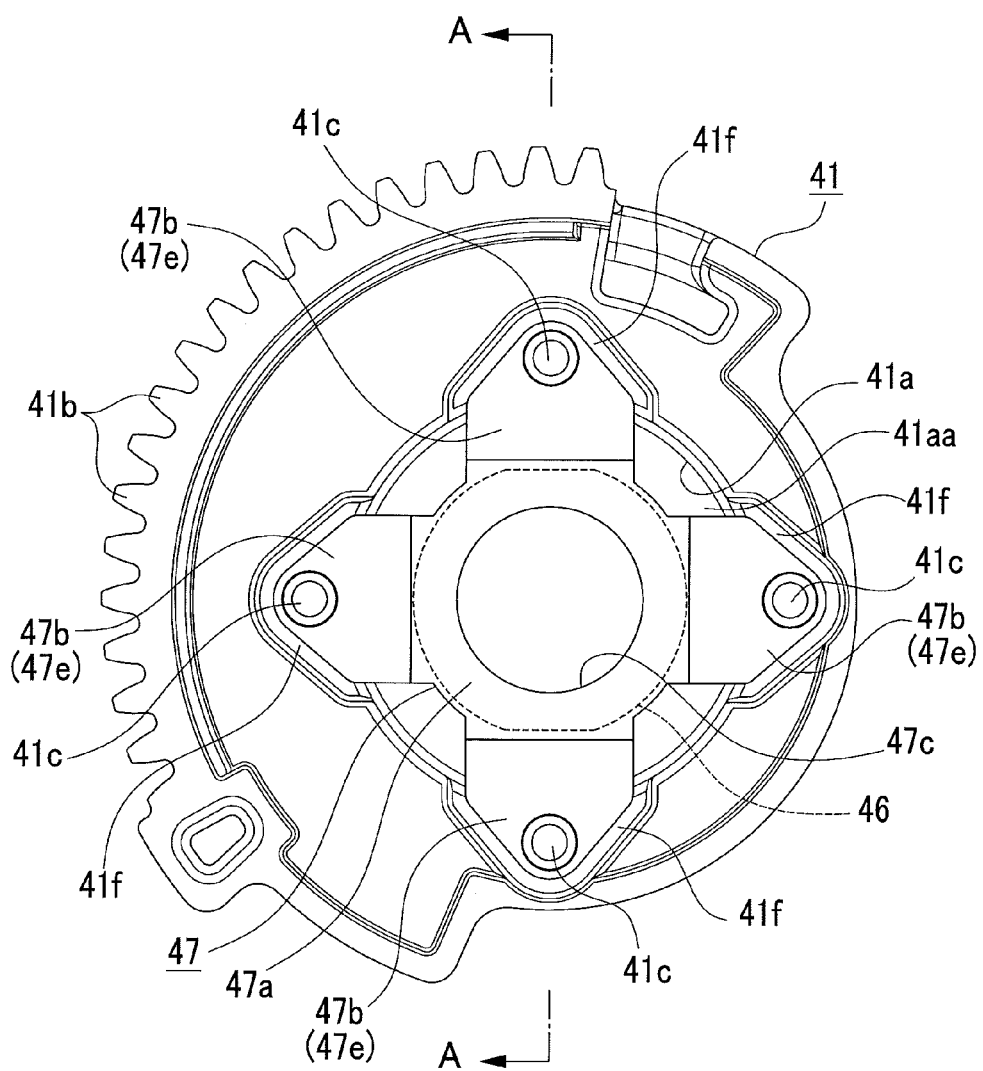
FIG. 7 is a front view showing a state that a magnet is mounted in a main gear in the first embodiment.
Figure 8:
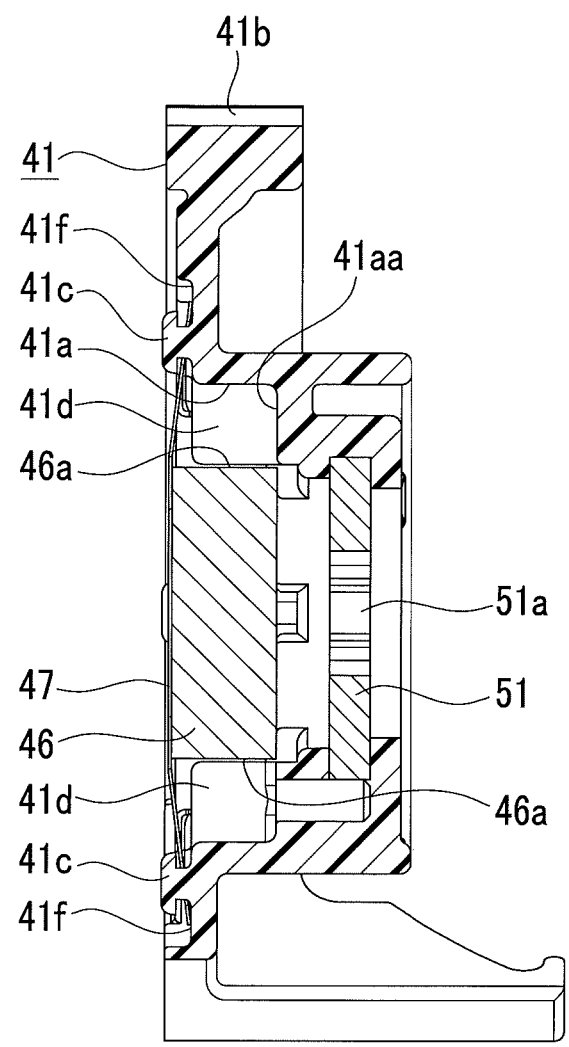
FIG. 8 is a cross-sectional view taken along a line A-A in FIG. 7, showing a state that the magnet is mounted in the main gear in the first embodiment.
Figure 9:
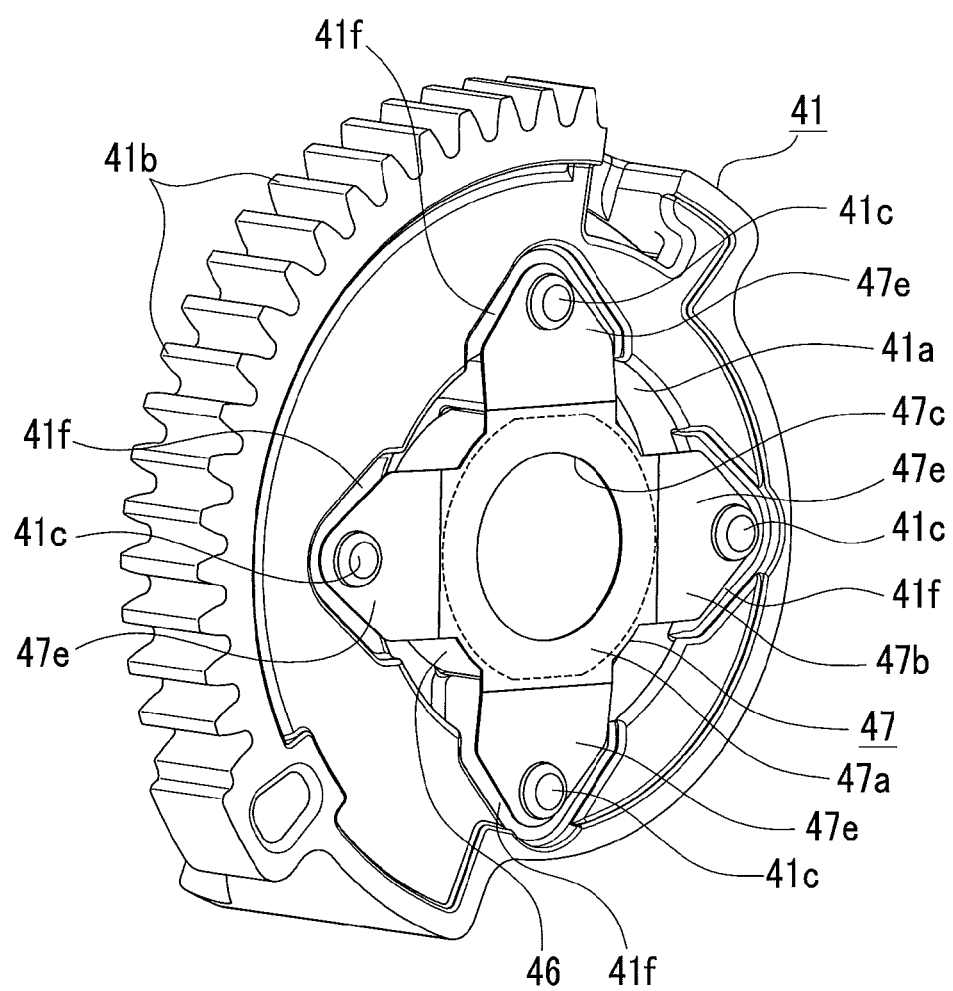
FIG. 9 is a perspective view showing a state that the magnet is mounted in the main gear in the first embodiment.
Figure 10:
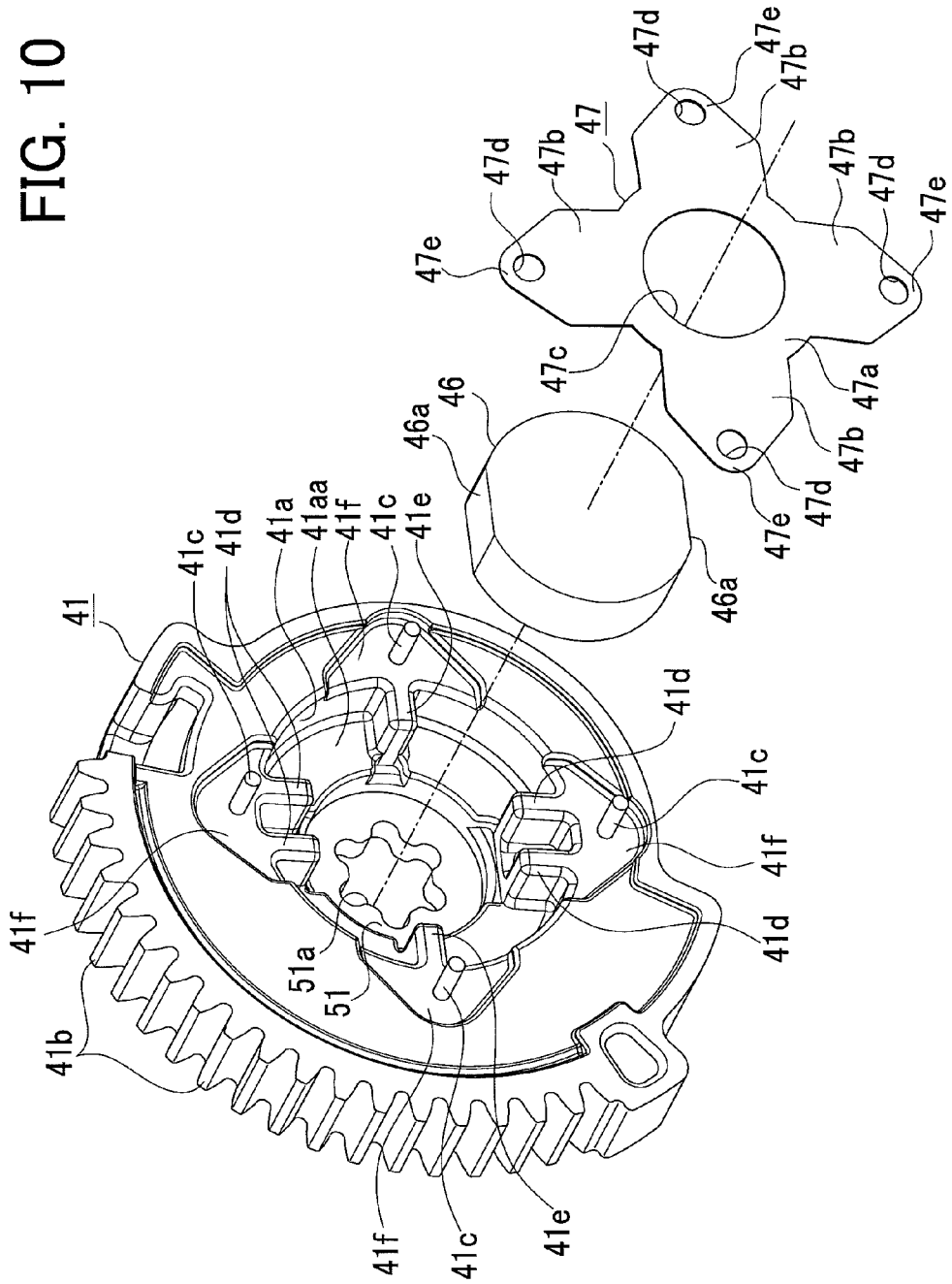
FIG. 10 is an exploded perspective view showing a way of mounting the magnet in the main gear in the first embodiment.

Next, a rotation angle detection apparatus in the present embodiment is explained in detail. FIG. 7 is a front view showing a state that the magnet 46 is mounted in the main gear 41. FIG. 8 is a cross-sectional view taken along a line A-A in FIG. 7, showing a state that the magnet 46 is mounted in the main gear 41. FIG. 9 is a perspective view showing a state that the magnet 46 is mounted in the main gear 41. FIG. 10 is an exploded perspective view showing a way of mounting the magnet 46 in the main gear 41. As shown in FIGS. 7 to 10, the main gear 41 has a plurality of teeth 41b on an outer circumference. The main gear 41 includes a bottomed recessed part 41a and four mounting pins 41c arranged around the recessed part 41a on one end face of the main gear 41 opposite to the other end face to which the proximal end of the rotary shaft 15 is fixed. Each of the mounting pins 41c is integrally formed in the resin-made main gear 41 and equally spaced apart from each other (by 90 degrees) about an axis of the main gear 41.

As shown in FIG. 10, the recessed part 41a is formed with a bottom 41aa provided integrally on its center with a fixing plate 51 for fixing the rotary shaft 15. The fixing plate 51 is formed with a deformed hole 51a to be connected to the proximal end of the rotary shaft 15. The bottom 41aa of the recessed part 41a is formed with four groups of ribs 41d and 41e extending in a radial direction. The ribs 41d and 41d are arranged corresponding to the location of the respective mounting pins 41c. Each of the two groups of the ribs 41d opposite each other in a vertical direction includes two ribs arranged side by side in parallel to each other in FIG. 10. Each of the two groups of the ribs 41e opposite each other in a lateral direction in FIG. 10 includes one rib. A length of each of the ribs 41d and 41e in the radial direction of the bottom 41aa is made shorter than a length of the bottom 41aa in the radial direction. In correspondence with each of the four groups of ribs 41d and 41e, the main gear 41 is formed on its end face with chevron-like sunken portions 41f. The mounting pins 41c are positioned one in each of the sunken portions 41f.

Figure 11:
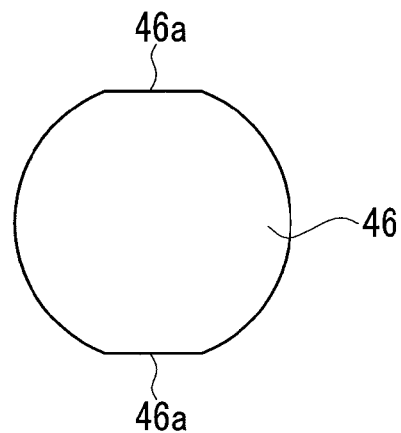
FIG. 11 is a front view of the magnet in the first embodiment.

FIG. 11 is a front view of the magnet 46. As shown in FIGS. 10 and 11, the magnet 46 is formed in an almost disc-like shape and a height (thickness) of the magnet 46 is made larger than a depth of the bottom 41aa of the recessed part 41a of the main gear 41. The magnet 46 has two width across flat surfaces 46a on its outer circumference. When the magnet 46 is inserted in the recessed part 41a, these surfaces 46a are arranged to face to the end faces of the ribs 41d opposite each other in the vertical direction in FIG. 10.

Figure 12:
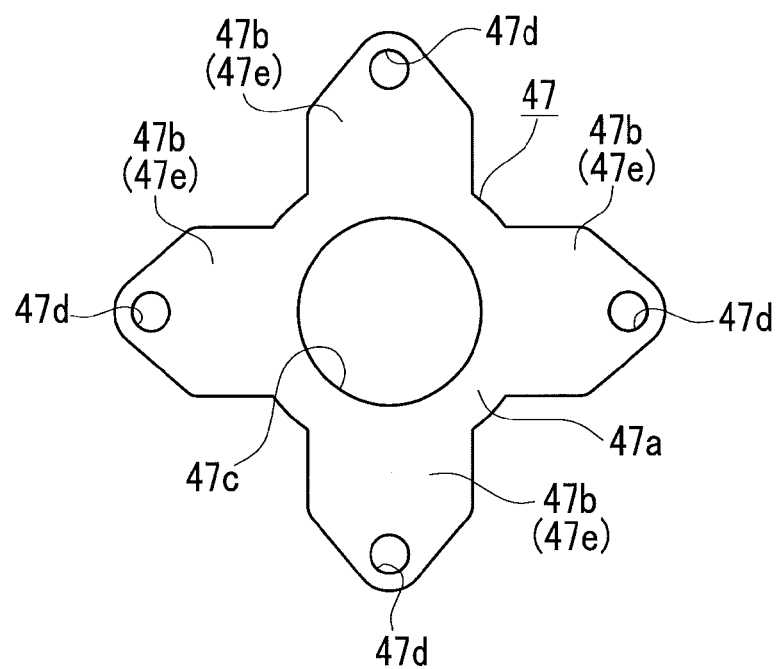
FIG. 12 is a front view of a retaining plate in the first embodiment.
Figure 13:
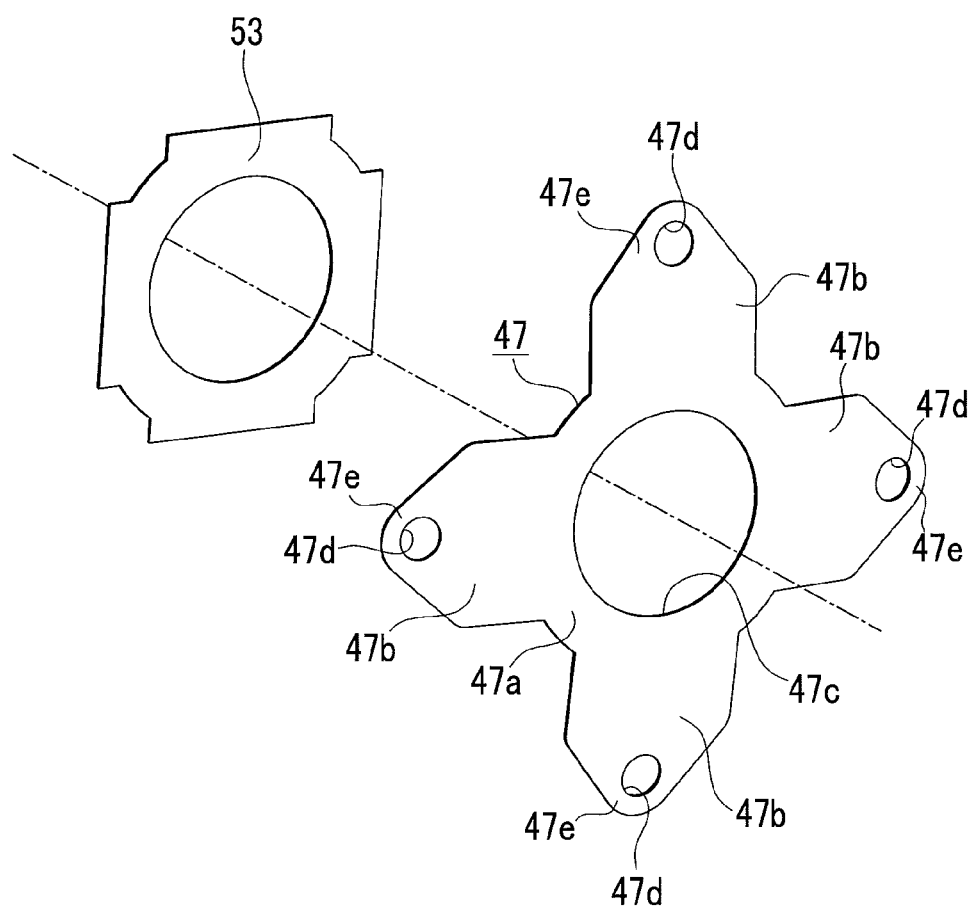
FIG. 13 is an exploded perspective view showing a configuration of the retaining plate in the first embodiment.

FIG. 12 is a front view of the retaining plate 47. FIG. 13 is an exploded perspective view showing a configuration of the retaining plate 47. The retaining plate 47 is configured to press and hold the magnet 46 inserted in the recessed part 41a against the main gear 41 as shown in FIG. 10. The retaining plate 47 is formed of spring material, such as stainless steel or phosphor bronze as non-magnetic material, and rubber material so that the plate 47 is elastically deformable. As shown in FIGS. 10 and 12, the overall retaining plate 47 is of almost cross-shape, including a center portion 47a for holding the magnet 46 and outer portions 47b extending radially outward in four directions from the center portion 47a. The center portion 47a is formed with a center opening 47c. The outer portions 47b are formed with four mounting holes 47d in which each mounting pin 41c is inserted. The outer portions 47b are four separate vane portions 47e. In the present embodiment, as shown in FIG. 13, the retaining plate 47 includes a rubber member 53 of an identical shape with the center portion 47a, and this rubber member 53 is attached to the center portion 47a on a side facing to the magnet 46. By providing the rubber member 53 on the center portion 47a, a surface of the center portion 47a of the retaining plate 47 has relatively high frictional coefficient. Thus, the surface of the center portion 47a of the retaining plate 47 has skidproof (anti-slip) effect.

As shown in FIG. 10, the magnet 46 is inserted in the recessed part 41a such that a part of the magnet 46 protrudes from an upper end of the recessed part 41a of the main gear 41. Then, as shown in FIGS. 7 to 10, the magnet 46 inserted in the recessed part 41a is pressed at an outer peripheral edge against the main gear 41 by the elastically deformed retaining plate 47. In this state, each of the mounting pins 41c inserted one in each of the mounting holes 47d is thermally caulked so that the magnet 46 is secured to the main gear 41.

According to the above explained EGR valve 1 configured with the double offset valve of the present embodiment, the valve element 14 is rotated around an axial line of the rotary shaft 15, and thereby the sealing surface 18 of the valve element 14 is moved between a valve-fully-closed position in which the sealing surface 18 is in surface-contact with the seat surface 17 of the valve seat 13 and a valve-fully-opened position in which the sealing surface 18 is separated most from the seat surface 17. In the state that the valve element 14 is placed in the valve-fully-closed position, namely in the valve-fully-closed state of the EGR valve 1, the valve hole 16 of the valve seat 13 is closed by the valve element 14, so that the EGR gas flow is shut off at the valve hole 16. Further, a portion between the valve element 14 and the valve seat 13 is sealed by the surface contact of the sealing surface 18 and the seat surface 17, thus preventing leakage of the EGR gas without providing any special elastic part or member for pressing down the valve seat 13 onto the valve element 14. Specifically, without providing any special elastic part or member, sealing property of the EGR valve 1 in the valve-fully-closed state can be ensured only by the configuration of the seat surface 17 of the valve seat 13 and the sealing surface 18 of the valve element 14.

In the valve-opened state of the EGR valve 1, the valve hole 16 of the valve seat 13 is opened and the EGR gas is allowed to flow through the valve hole 16. Further, when the valve element 14 starts to rotate in a valve-opening direction from the valve-fully-closed position, the sealing surface 18 of the valve element 14 starts to separate from the seat surface 17 of the valve seat 13 and starts to move along a rotation trail centered about the axial line of the rotary shaft 15, thus minimizing rubs between the sealing surface 18 and the seat surface 17. As a result, the valve element 14 can be swiftly rotated in valve opening to an extent that rubs between the valve element 14 and the valve seat 13 become minute, leading to reduction in friction between the sealing surface 18 and the seat surface 17. Consequently, the EGR valve 1 can achieve improved valve-opening responsiveness and durability with a simple structure without providing any special elastic part or member.

According to the rotation angle detection apparatus in the present embodiment, the magnet 46 inserted in the recessed part 41a of the main gear 41 is pressed at an outer peripheral edge onto the main gear 41 by an elastic force of the retaining plate 47. Thereby, the magnet 46 can be held in the main gear 41 without wobbling in the axial direction and the radial direction with a simple structure of the retaining plate 47.

Further in the present embodiment, the retaining plate 47 includes the center portion 47a pressing down the magnet 46 and the outer portions 47b include the plurality of vane portions 47e located one in each of the mounting holes 47d. Therefore, the force pressing the magnet 46 against the main gear 41 acts on the peripheral edge of the magnet 46 through the plurality of vane portions 47e located in outer portion of the retaining plate 47. Accordingly, movement of the magnet 46 in the main gear 41 in the radial direction can be especially restricted, enhancing a retaining force of the magnet 46 in a fixed position.

Moreover, according to the present embodiment, the magnet 46 is pressed against the main gear 41 by the center portion 47a of the retaining plate 47, thereby providing skidproof effect between the center portion 47a and a surface of the magnet 46, so that the magnet 46 hardly moves in the axial and radial directions. Accordingly, the movement of the magnet 46 in the main gear 41 in the axial and radial directions can be further restricted, further enhancing the retaining force of the magnet 46 in the fixed position.

In the present embodiment, the retaining plate 47 is secured to the main gear 41 not by bonding but by thermally caulking each of the mounting pins 41c. Thereby, a period of time for mounting the magnet 46 in the main gear 41 can be made shorter than a case of mounting the magnet by bonding. Further, since a part of the retaining plate 47 is thermally caulked to secure the magnet 46 to the main gear 41, a thermal load is not directly transmitted to the magnet 46 and thus the magnet 46 is not influenced by thermal change during fixation and after the fixation.

Second Embodiment

A second embodiment of a rotation angle detection apparatus of the present invention embodied as an EGR valve provided with a double offset valve is now explained referring to the accompanying drawings.

In the following embodiment, similar or identical elements to those in the first embodiment are given the same reference signs as in the first embodiment, and the following explanation will be made with a focus on differences from the first embodiment.

Figure 14:
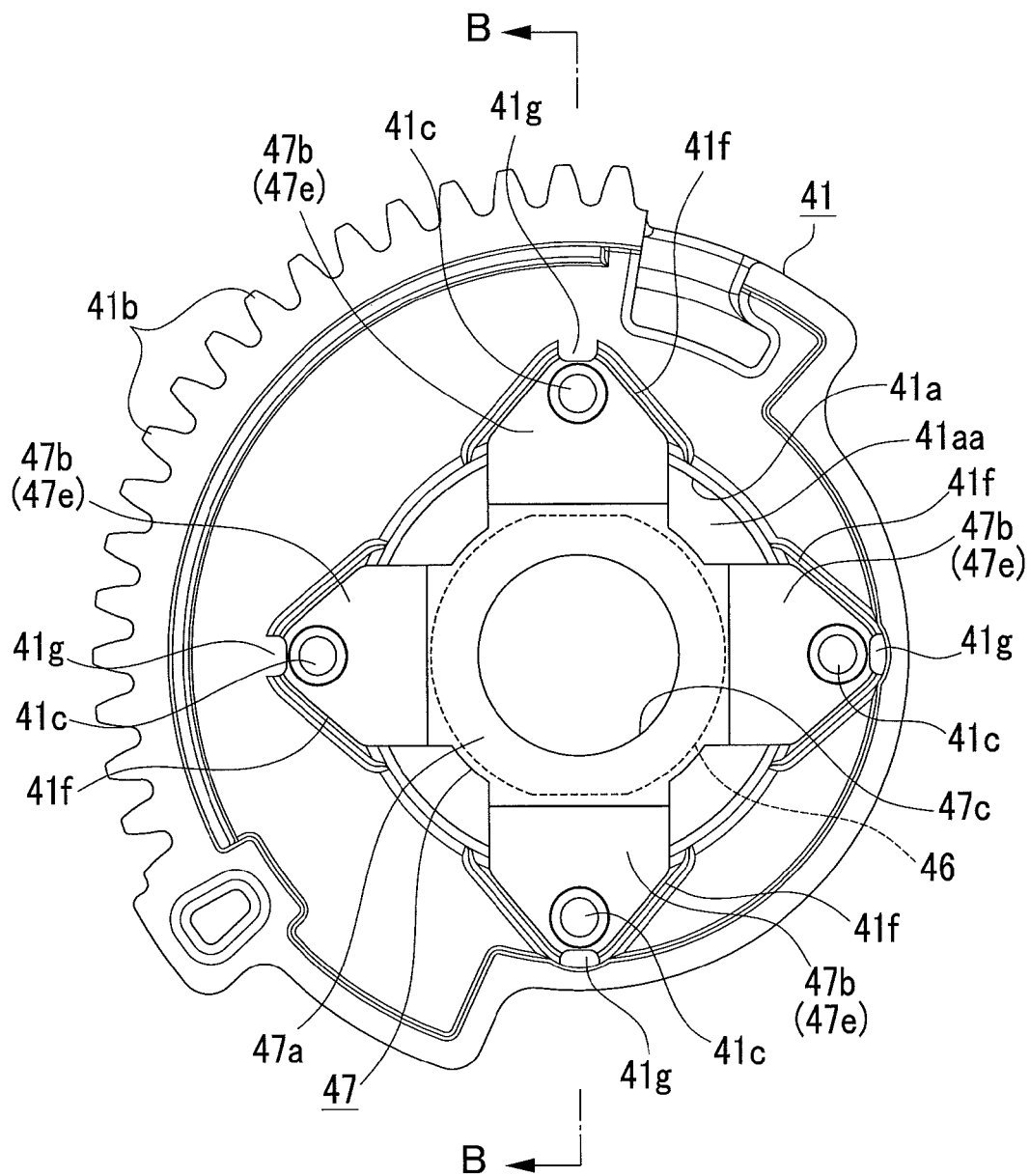
FIG. 14 is a front view showing a state that a magnet is mounted in a main gear in a second embodiment.
Figure 15:
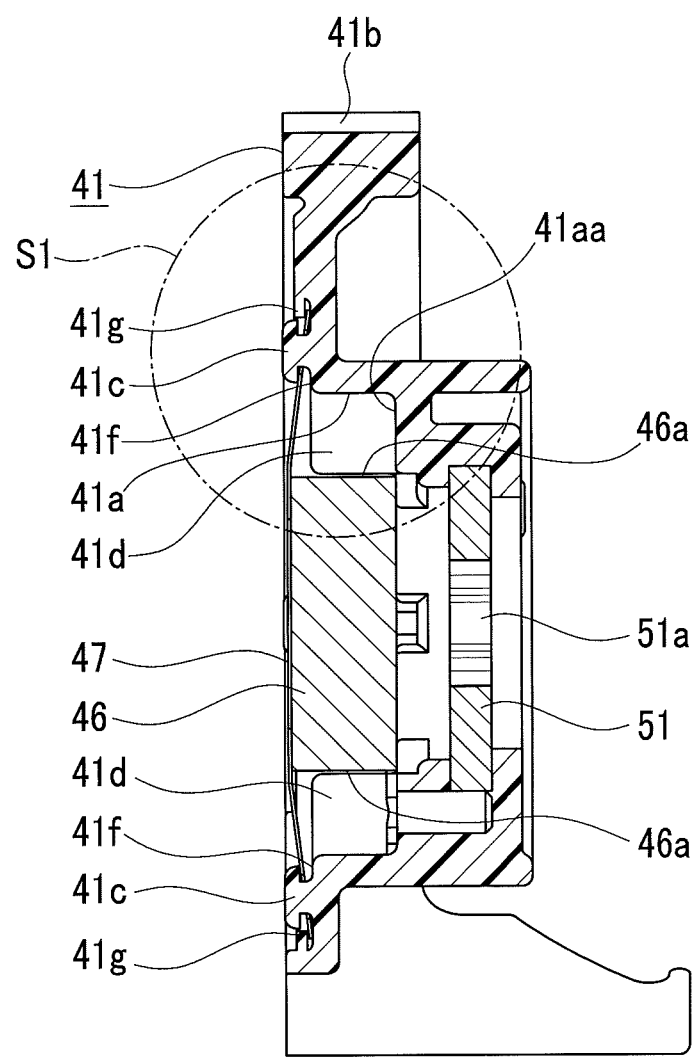
FIG. 15 is a cross-sectional view taken along a line B-B in FIG. 14, showing a state that the magnet is mounted in the main gear in the second embodiment.
Figure 16:
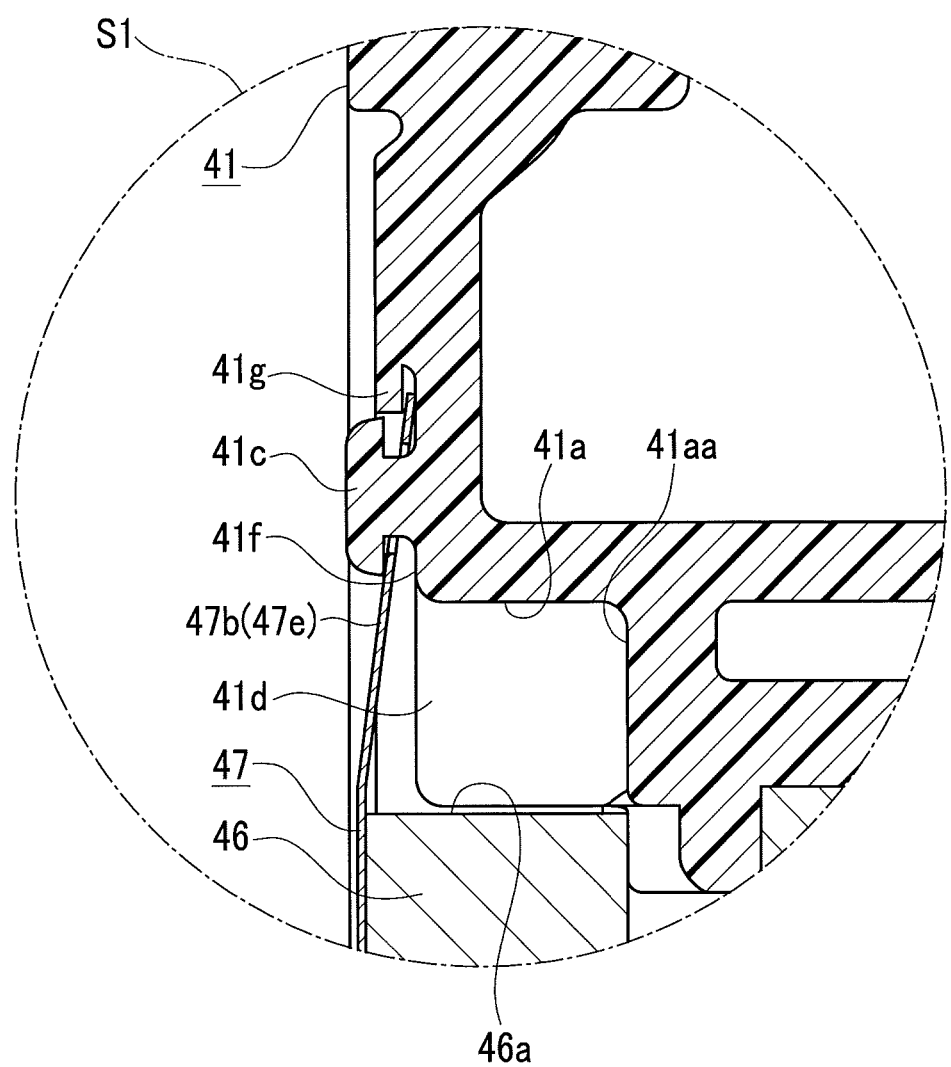
FIG. 16 is an enlarged sectional view of a portion indicated with a chain-dotted circle in FIG. 15 in the second embodiment.

The second embodiment is different from the first embodiment as for a configuration of the main gear 41. FIG. 14 is a front view showing a state that the magnet 46 is mounted in the main gear 41. FIG. 15 is a cross-sectional view taken along a line B-B in FIG. 14, showing a state that the magnet 46 is mounted in the main gear 41. FIG. 16 is an enlarged sectional view of a chain-dotted circle Si in FIG. 15. As shown in FIG. 14, the recessed part 41a of the main gear 41 is formed with four sunken portions 41f around the recessed part 41a, and a chevron-like upward projecting curve of each of the sunken portions 41f is formed with a lock portion 41g protruding radially inwardly in the sunken portion 41f like a flange. The lock portions 41g are integrally formed in the main gear 41. As shown in FIGS. 14 to 16, each of the lock portions 41g is arranged to restrict spring back of each vane portion 47e of the retaining plate 47, and a distal outer edge of each of the vane portions 47e comes under the lock portion 41g so that the vane portions 47e are locked by the lock portions 41g.

Therefore, according to the second embodiment, even if the mounting pins 41c thermally caulked to the main gear 41 are broken by any chance, the outer portions 47b of the retaining plate 47, i.e., the distal outer edge of each of the vane portions 47e remains engaged with the corresponding lock portions 41g and thus the retaining plate 47 is not disengaged from the main gear 41. As a result, even if each of the thermally caulked mounting pins 41c is broken by any chance, the magnet 46 can be held in the main gear 41, ensuring the function as the rotation angle detection apparatus.

Third Embodiment

A third embodiment of a rotation angle detection apparatus of the present invention embodied as an EGR valve provided with a double offset valve is now explained referring to the accompanying drawings.

Figure 17:
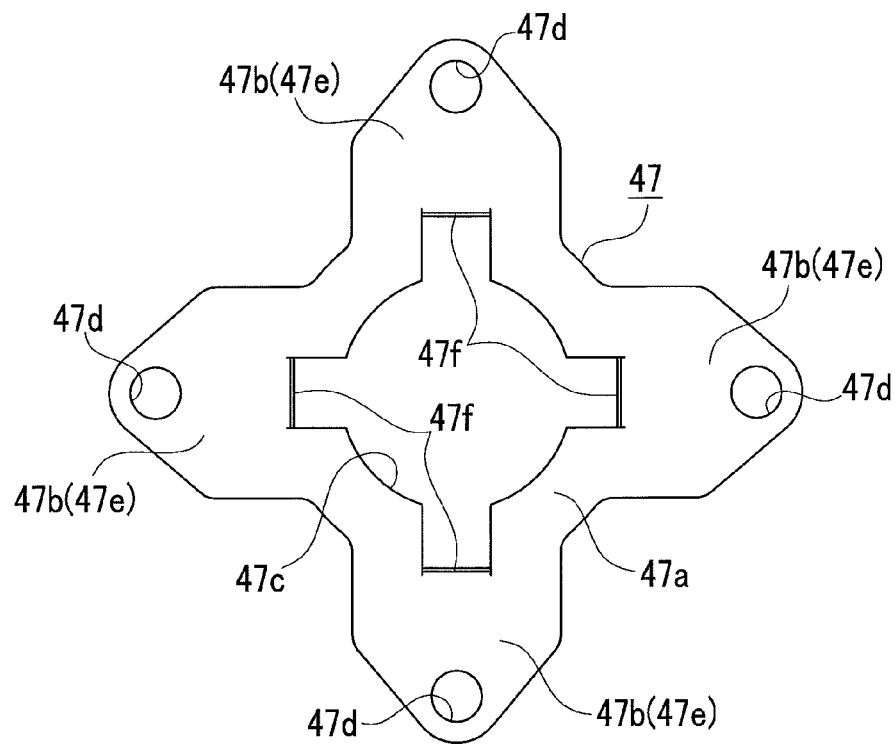
FIG. 17 is a front view of a retaining plate in a third embodiment.
Figure 18:
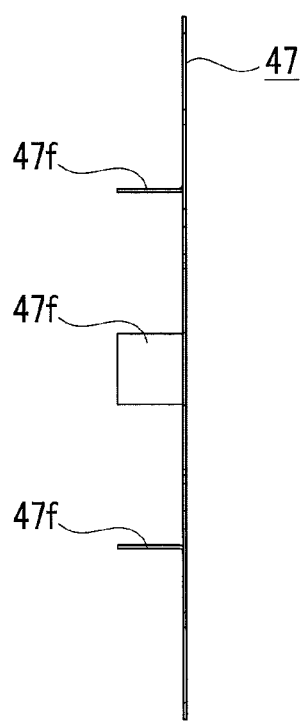
FIG. 18 is a left-side view of the retaining plate in the third embodiment.
Figure 19:
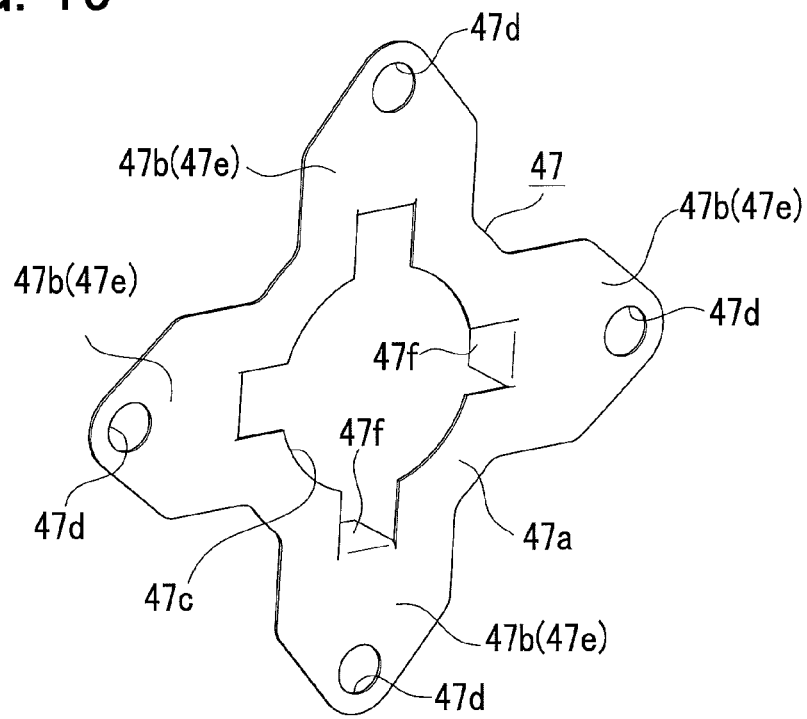
FIG. 19 is a perspective view of the retaining plate seen from a front side in the third embodiment.
Figure 20:
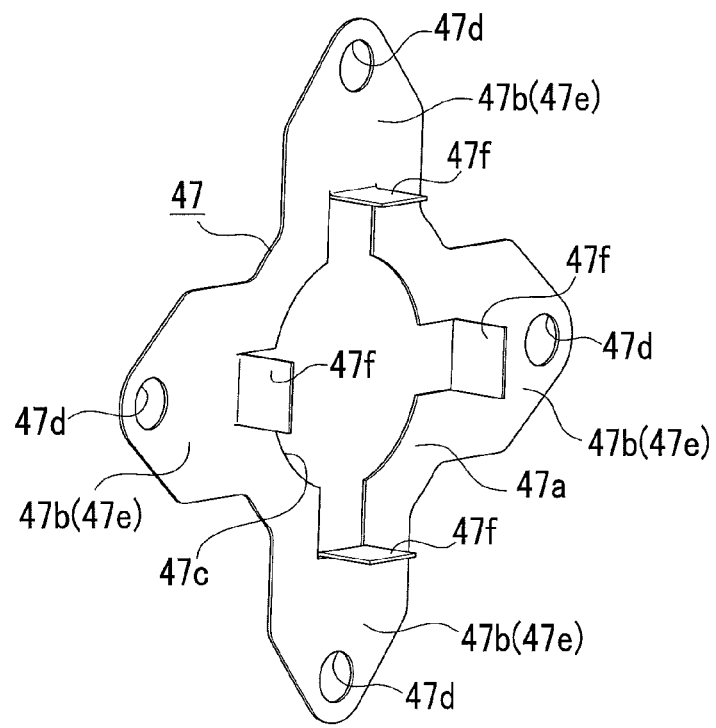
FIG. 20 is a perspective view of the retaining plate seen from a rear side in the third embodiment.

The third embodiment is different from the foregoing embodiments as for a configuration of the retaining plate 47. FIG. 17 is a front view of the retaining plate 47. FIG. 18 is a left-side view of the retaining plate 47. FIG. 19 is a perspective view of the retaining plate 47 seen from a front side. FIG. 20 is a perspective view of the retaining plate 47 seen from a rear side. As shown in FIGS. 17 to 20, the retaining plate 47 is formed with a plurality of elastically deformable hook portions 47f for clamping a peripheral surface of the magnet 46 in a state that the magnet 46 is pressed against the main gear 41. Each hook portion 47f is formed by partially cutting and bending an inner peripheral part around a center opening 47c of the center portion 47a of the retaining plate 47 into a tongue-like shape, and the hook portions 47f are bent toward a rear side in correspondence with the location of each of the vane portions 47e. In the third embodiment, the retaining plate 47 is made of non-magnetic metal to be elastically deformable. Therefore, each hook portion 47f is also elastically deformable. In this third embodiment, each hook portion 47f is bent at right angle with respect to the center portion 47a and the vane portions 47e. Specifically, when the retaining plate 47 is attached on the magnet 46 inserted in the recessed part 41a of the main gear 41, each hook portion 47f is not in contact with the peripheral surface of the magnet 46. Thereafter, when the magnet 46 is pressed by the retaining plate 47 and each of the vane portions 47e is thermally caulked with the mounting pins 41c, the vane portions 47e are inclined toward the mounting pins 41c. As a result, this inclination of the vane portions 47e leads to inward inclination of the hook portions 47f toward the magnet 46 to have the surface contact with the peripheral surface of the magnet 46, so that the magnet 46 is held with an elastic force.

According to the third embodiment, the side faces of the magnet 46 are held by the plurality of hook portions 47f with the elastic force in a state that the magnet 46 is pressed against the main gear 41 by the retaining plate 47. Thus, the movement of the magnet 46 in the radial direction in the main gear 41 can be further restricted, further enhancing the retained state of the magnet 46 in the fixed position.

Fourth Embodiment

A fourth embodiment of a rotation angle detection apparatus of the present invention embodied as an EGR valve provided with a double offset valve is now explained referring to the accompanying drawings.

Figure 21:
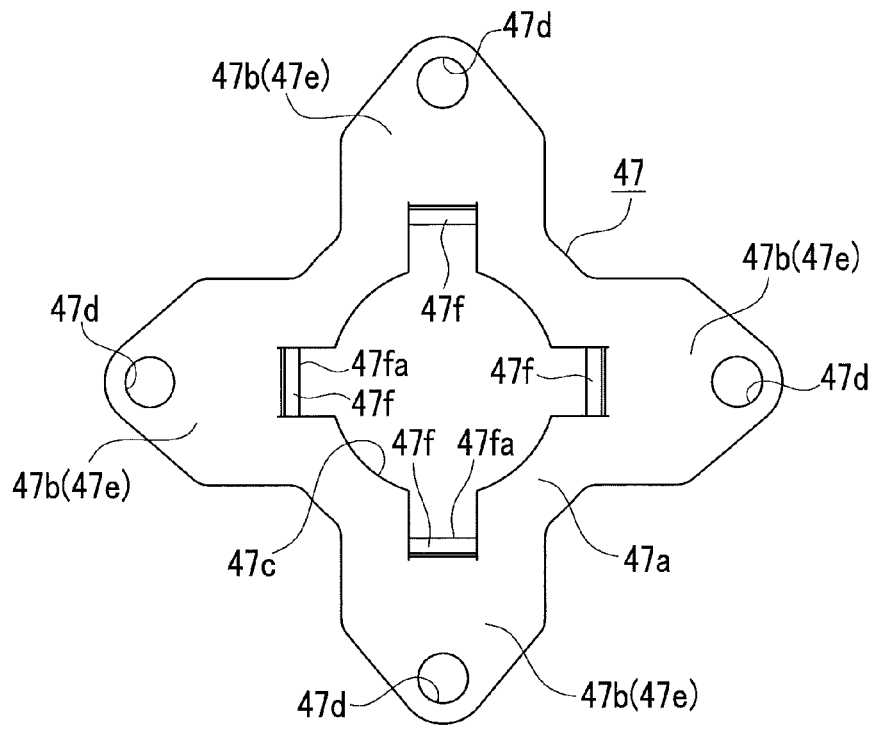
FIG. 21 is a front view of a retaining plate in a fourth embodiment.
Figure 22:
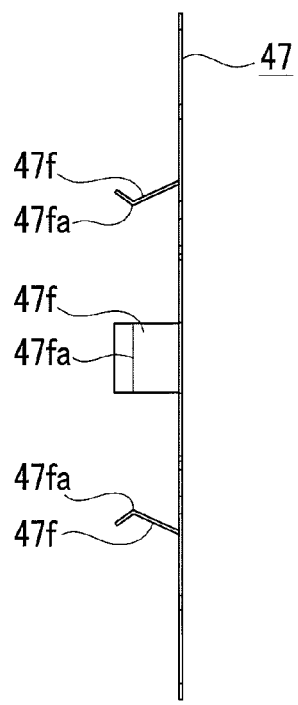
FIG. 22 is a left-side view of the retaining plate in the fourth embodiment.
Figure 23:
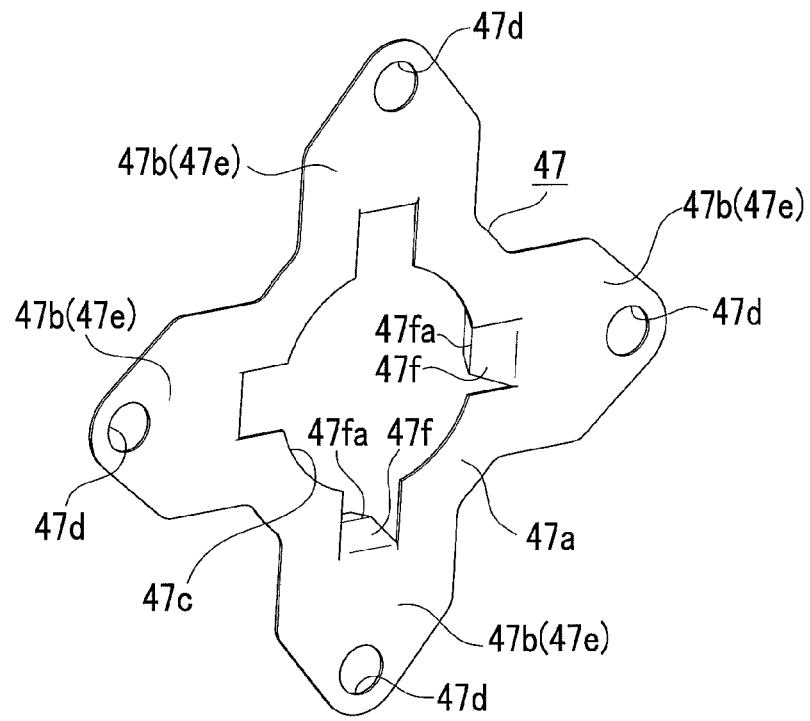
FIG. 23 is a perspective view of the retaining plate seen from a front side in the fourth embodiment.
Figure 24:
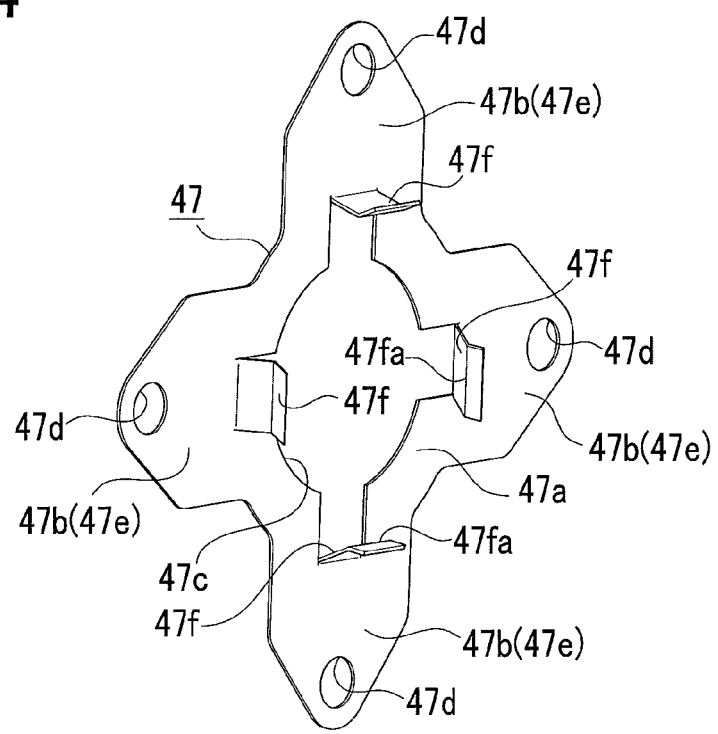
FIG. 24 is a perspective view of the retaining plate seen from a rear side in the fourth embodiment.

The fourth embodiment is different from the third embodiment as for a configuration of the hook portion 47f of the retaining plate 47. FIG. 21 is a front view of the retaining plate 47. FIG. 22 is a left-side view of the retaining plate 47. FIG. 23 is a perspective view of the retaining plate 47 seen from a front side. FIG. 24 is a perspective view of the retaining plate 47 seen from a rear side. As shown in FIGS. 21 to 24, in the fourth embodiment, each hook portion 47f is bent in a V-shape (an inverted L-shape) tilting toward a center of the retaining plate 47. Accordingly, when the magnet 46 is pressed down by the retaining plate 47, a bent portion 47fa of each of the hook portions 47f comes to contact with the peripheral surface of the magnet 46.

According to the fourth embodiment, the hook portions 47f are each bent and the bent portions 47fa come to contact with the peripheral surface of the magnet 46, so that the peripheral surface of the magnet 46 is further firmly held with an elastic force of the bent portions 47fa of the hook portions 47f. Thereby, the movement of the magnet 46 in the main gear 41 in the radial direction is further surely restricted, further enhancing the retained state of the magnet 46 in the fixed position. Moreover, since the hook portions 47f are in contact with the peripheral surface of the magnet 46 through the respective bent portions 47fa, the magnet 46 is not scratched by the hook portions 47f.

Fifth Embodiment

A fifth embodiment of a rotation angle detection apparatus of the present invention embodied as an EGR valve provided with a double offset valve is now explained referring to the accompanying drawings.

Figure 25:
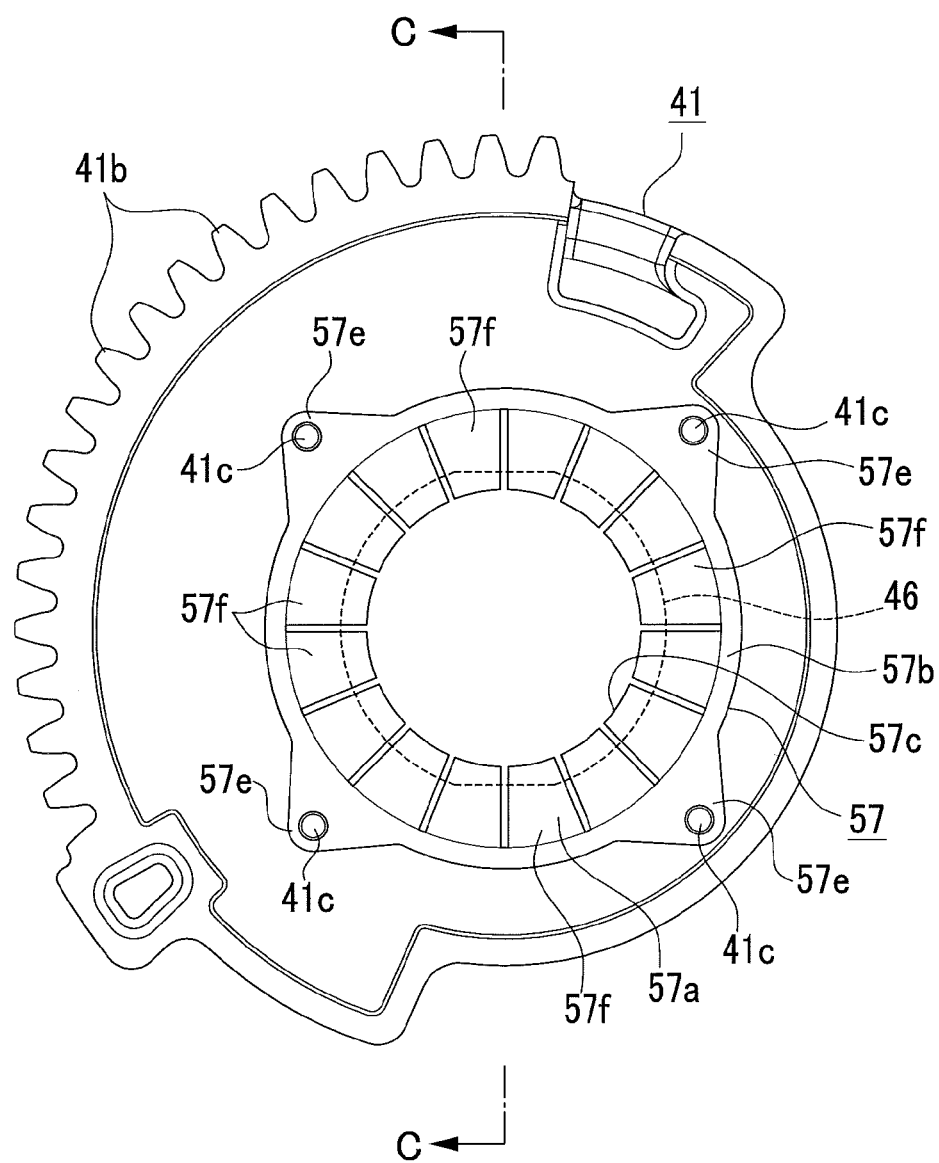
FIG. 25 is a front view showing a state that a magnet is mounted in a main gear in a fifth embodiment.
Figure 26:
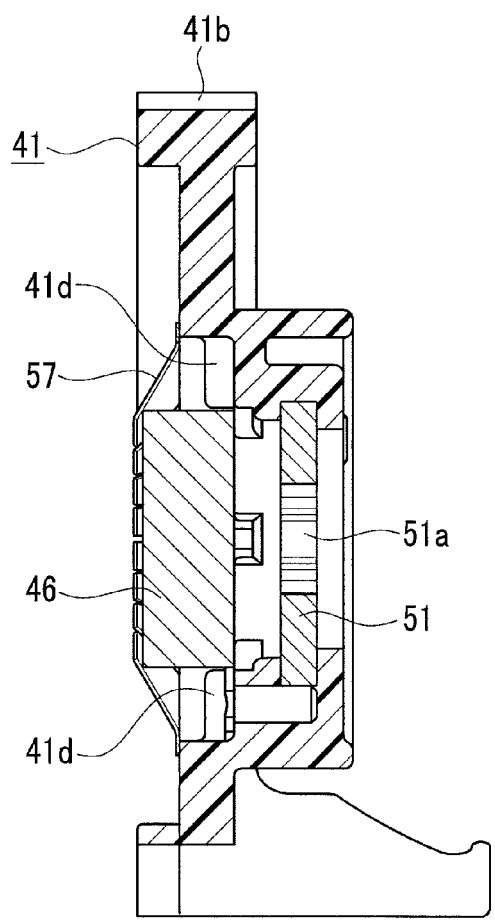
FIG. 26 is a cross-sectional view taken along a line C-C in FIG. 25, showing a state that the magnet is mounted in the main gear in the fifth embodiment.
Figure 27:
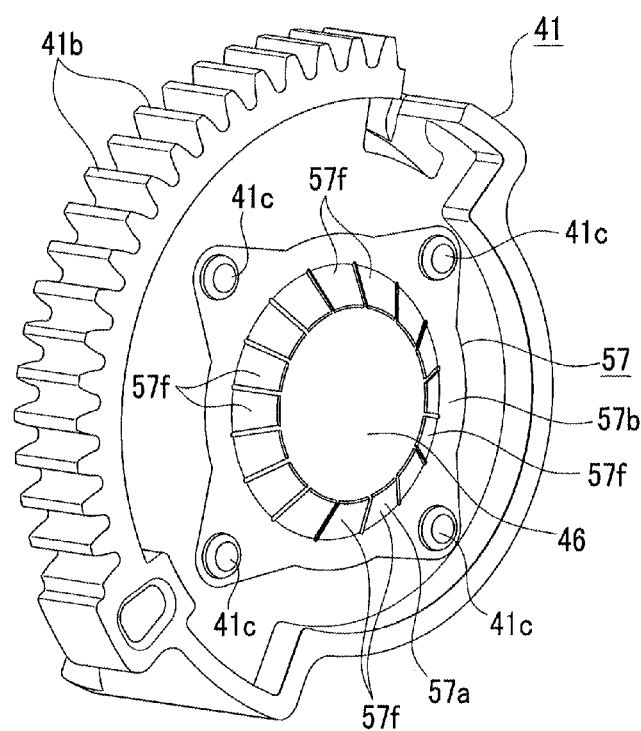
FIG. 27 is a perspective view showing a state that the magnet is mounted in the main gear in the fifth embodiment.
Figure 28:
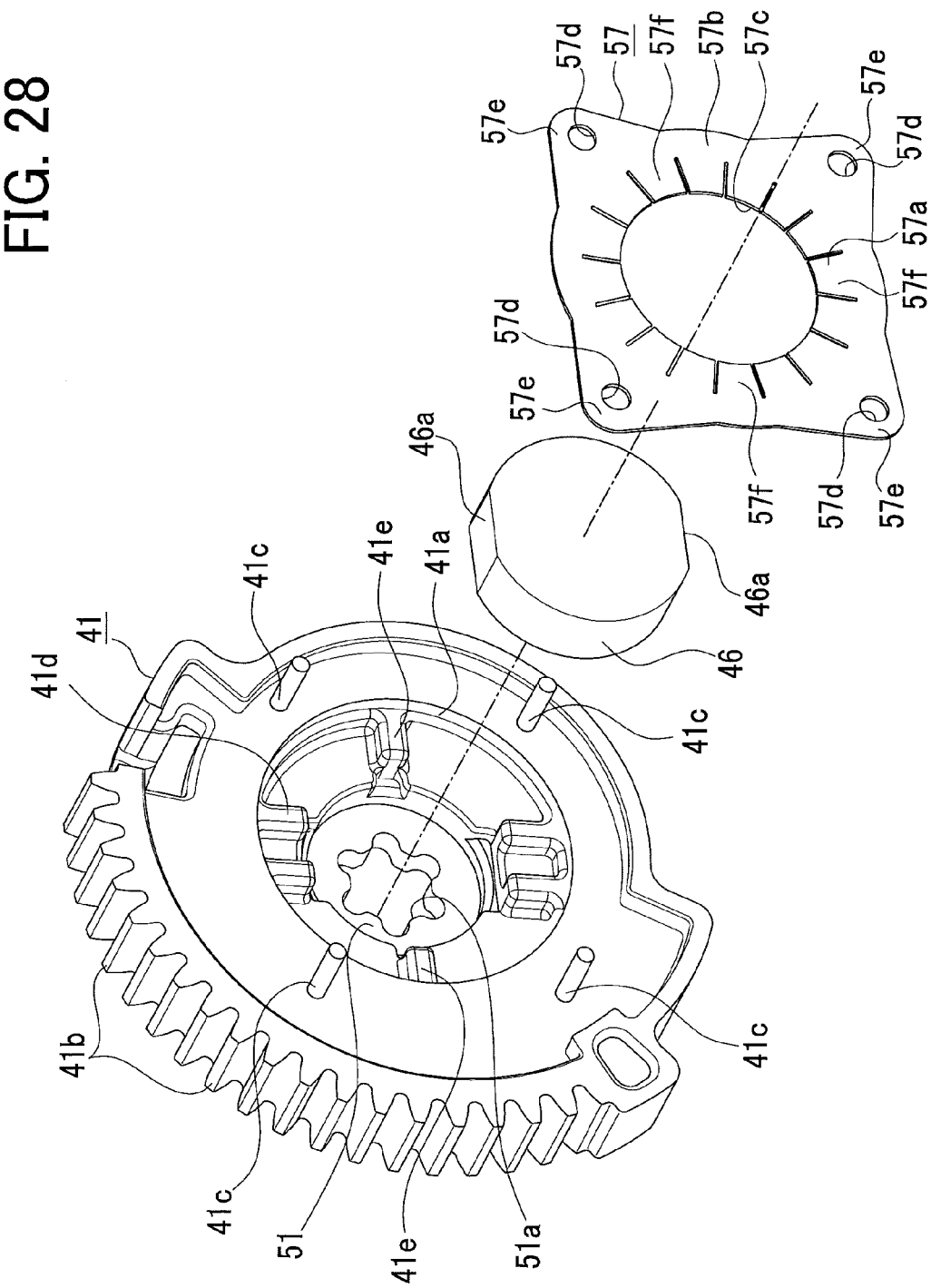
FIG. 28 is an exploded perspective view showing a way of mounting the magnet in the main gear in the fifth embodiment.
Figure 29:
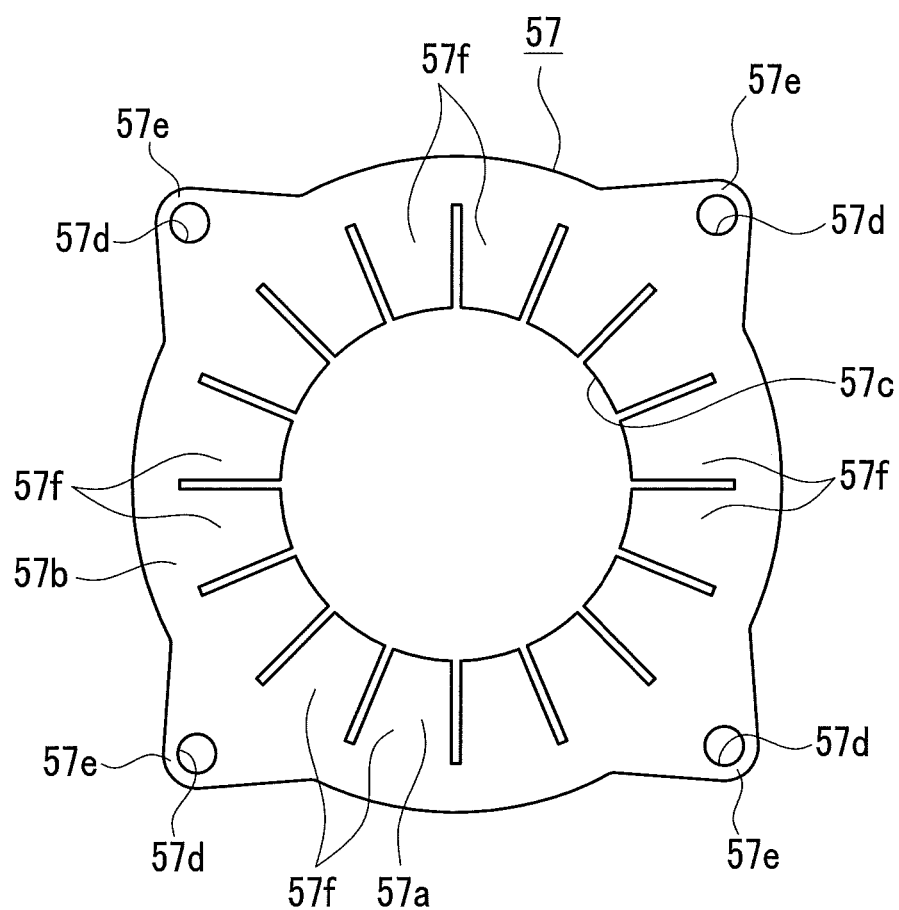
FIG. 29 is a front view of the retaining plate in the fifth embodiment.

In the fifth embodiment, a configuration of a retaining plate 57 is different from that in the foregoing embodiments. FIG. 25 is a front view showing a state that the magnet 46 is mounted in the main gear 41. FIG. 26 is a cross-sectional view taken along a line C-C in FIG. 25, showing the state that the magnet 46 is mounted in the main gear 41. FIG. 27 is a perspective view showing a state that the magnet 46 is mounted in the main gear 41. FIG. 28 is an exploded perspective view showing a way of mounting the magnet 46 in the main gear 41. FIG. 29 is a front view of the retaining plate 57.

As shown in FIG. 29, the retaining plate 57 of the fifth embodiment is formed in an almost square shape as a whole, and made of elastically-deformable non-magnetic metal. An outer portion 57b of the retaining plate 57 includes four elastically deformable vane portions 57e. Each of the vane portions 57e is formed in an almost chevron-like shape and formed with a mounting hole 57d. The retaining plate 57 is formed with a center opening 57c in a center portion 57a which is configured to press the magnet 46. An inner periphery portion defining the center opening 57c is split into a plurality of elastically deformable tongue pieces 57f.

As shown in FIG. 28, an end face of the main gear 41 is provided with a plurality of mounting pins 41c protruding in locations one in each of the mounting holes 57d of the retaining plate 57. In the fifth embodiment, the sunken portion 41f shown in FIG. 10 and others is not provided in portions where the mounting pins 41c are arranged.

As shown in FIG. 28, the magnet 46 is inserted in the recessed part 41a such that a part of the magnet 46 protrudes from an upper end of the recessed part 41a of the main gear 41. Then, as shown in FIGS. 25 to 28, the magnet 46 inserted in the recessed part 41a is pressed against the main gear 41 in a manner that each of the tongue pieces 57f of the retaining plate 57 is elastically deformed, and the respective mounting pins 41c are inserted in the corresponding mounting holes 57d of the vane portions 57e. Finally, the mounting pins 41c are thermally caulked to secure the magnet 46 to the main gear 41.

According to the rotation angle detection apparatus of the fifth embodiment, the magnet 46 inserted in the recessed part 41a of the main gear 41 is pressed to the main gear 41 with the elastic force of the retaining plate 57. Thereby, in the main gear 41 retaining the magnet 46, the magnet 46 can be held with a simple structure without wobbling in the axial and radial directions.

Further, according to the fifth embodiment, the pressing force pressing the magnet 46 against the main gear 41 acts on a center of the magnet 46 by the plurality of tongue pieces 57f of the center portion 57a of the retaining plate 57. Accordingly, the movement of the magnet 46 in the main gear 41 in the radial direction can be especially restricted, thus enhancing the retaining force of the magnet 46 in the fixed position.

Sixth Embodiment

A sixth embodiment of a rotation angle detection apparatus of the present invention embodied as an EGR valve provided with a double offset valve is now explained referring to the accompanying drawings.

Figure 30:
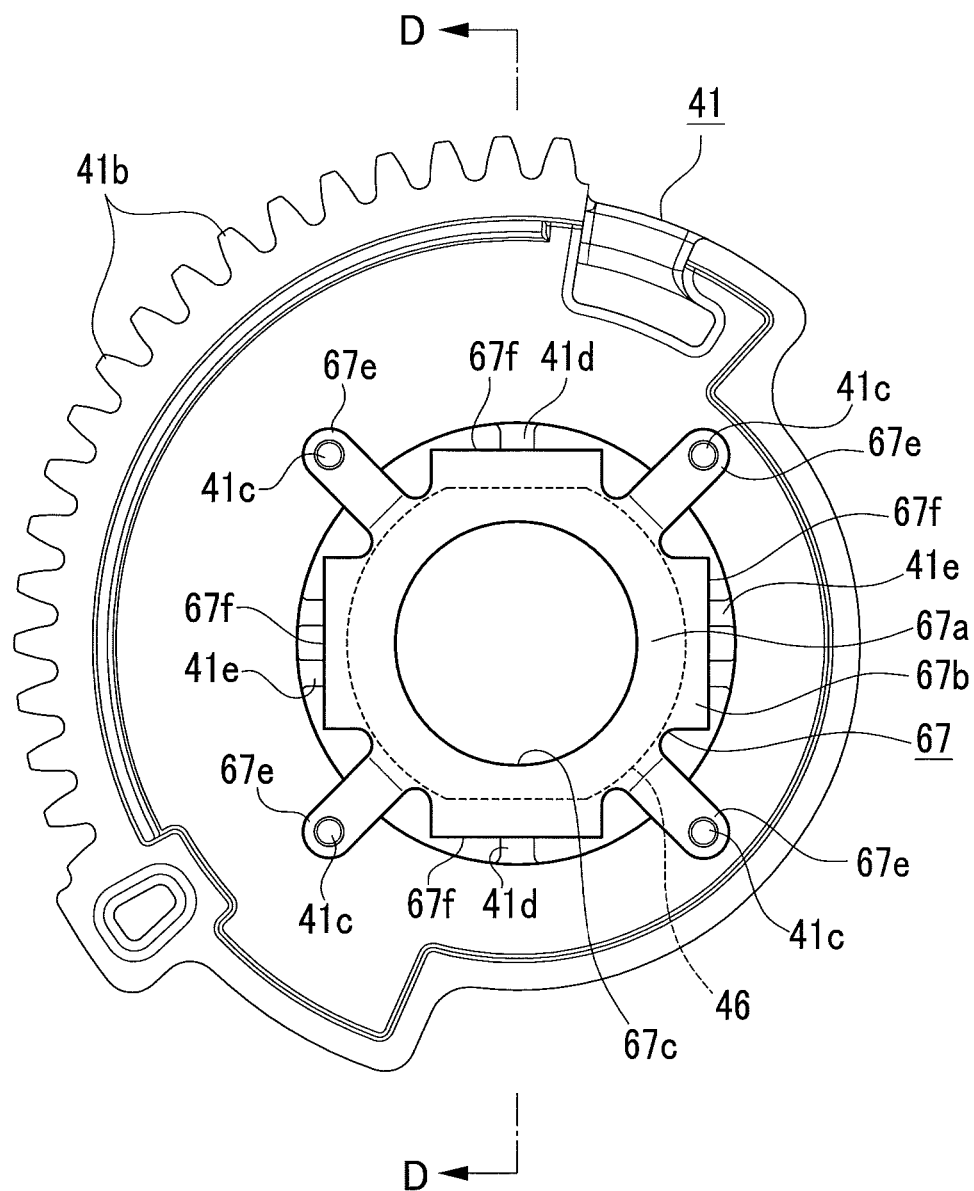
FIG. 30 is a front view showing a state that a magnet is mounted in a main gear in a sixth embodiment.
Figure 31:
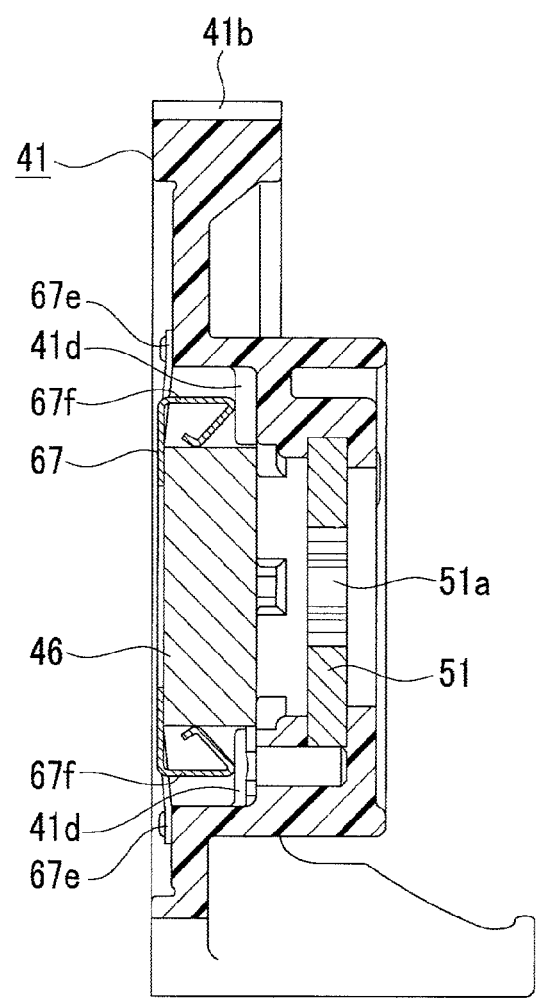
FIG. 31 is a cross-sectional view taken along a line D-D in FIG. 30, showing a state that the magnet is mounted in the main gear in the sixth embodiment.
Figure 32:
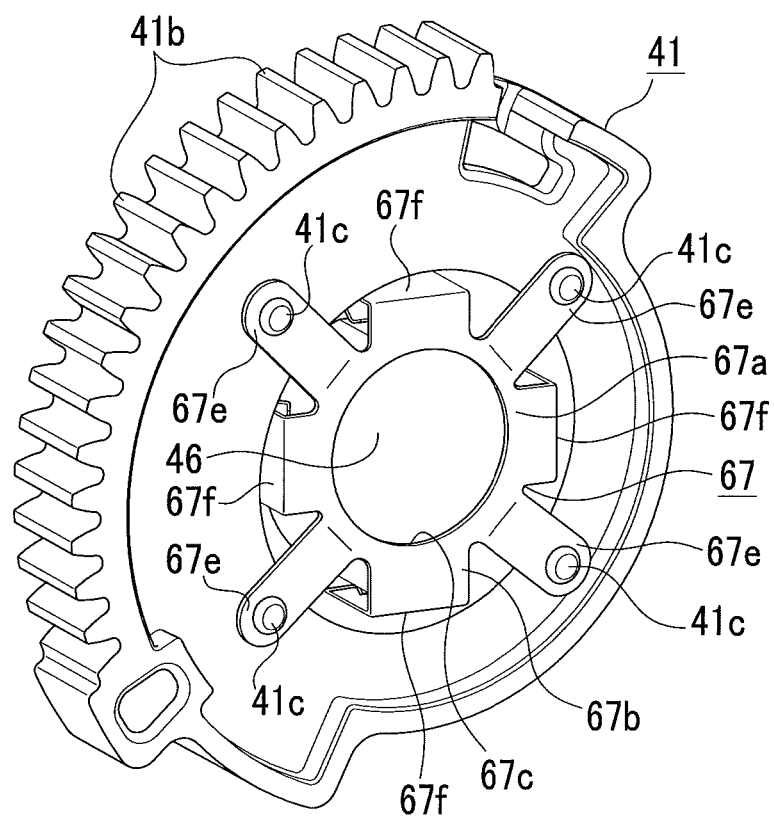
FIG. 32 is a perspective view showing a state that the magnet is mounted in the main gear in the sixth embodiment.
Figure 33:
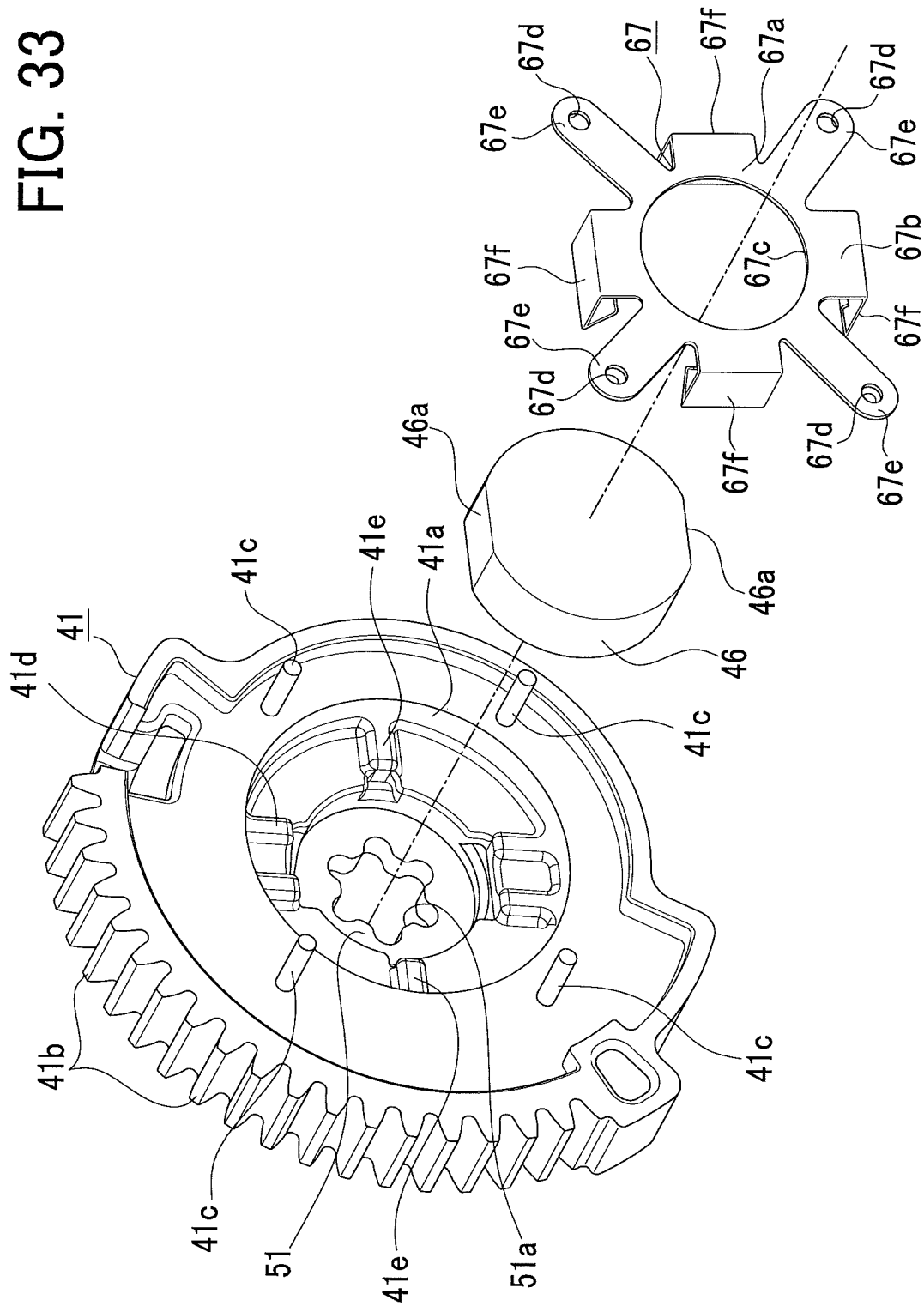
FIG. 33 is an exploded perspective view showing a way of mounting the magnet in the main gear in the sixth embodiment.
Figure 34:
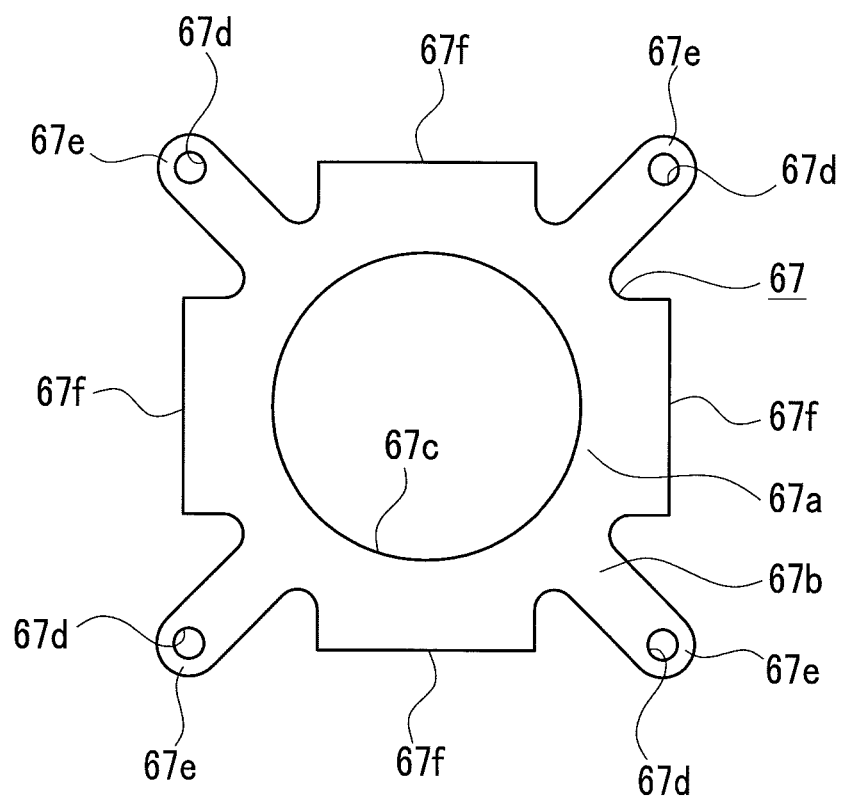
FIG. 34 is a front view of the retaining plate in the sixth embodiment.
Figure 35:
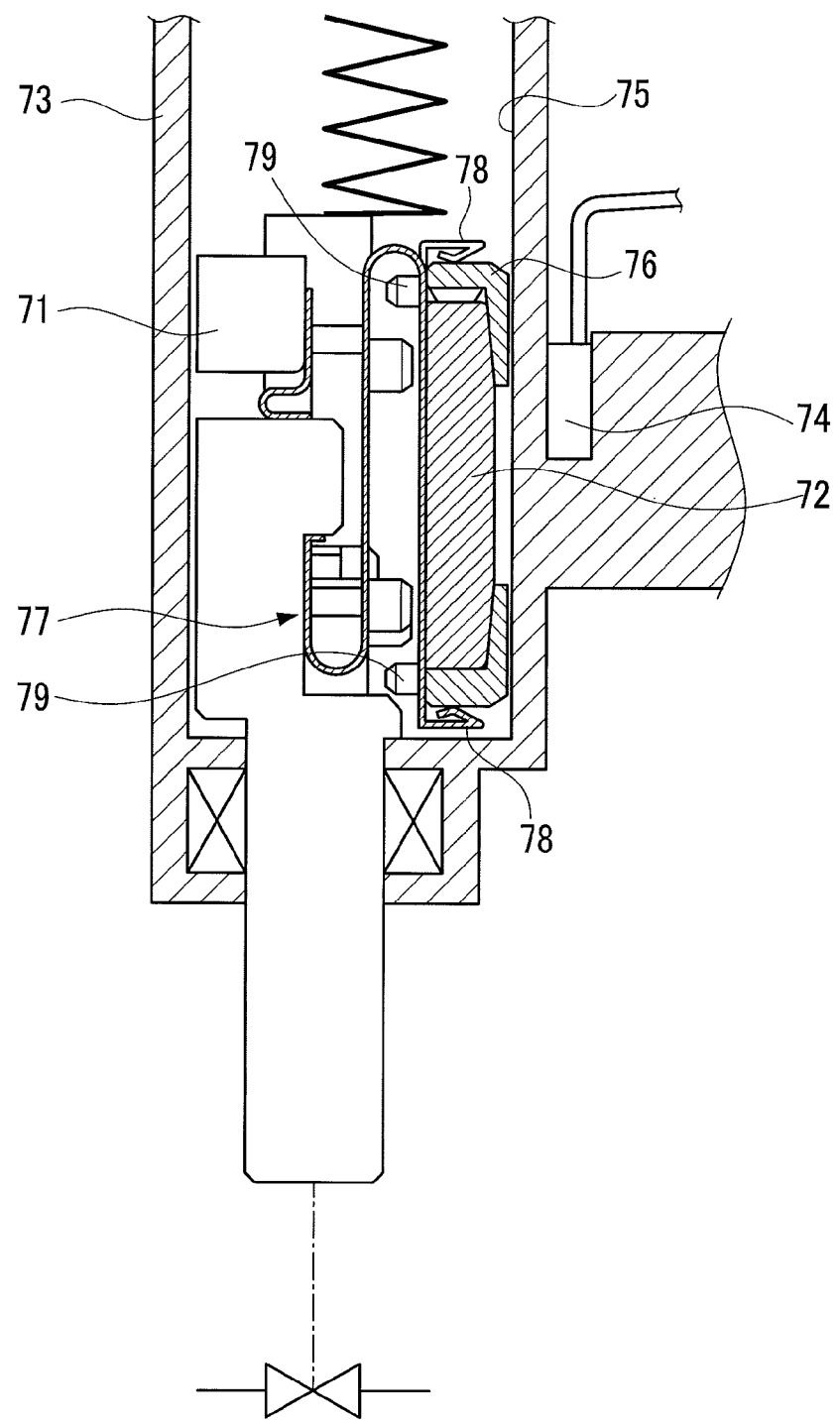
FIG. 35 is a sectional view of a movement detection apparatus according to a related art.

In the sixth embodiment, a configuration of a retaining plate 67 is different from the foregoing embodiments. FIG. 30 is a front view showing a state that the magnet 46 is mounted in the main gear 41. FIG. 31 is a cross-sectional view taken along a line D-D in FIG. 30, showing the state that the magnet 46 is mounted in the main gear 41. FIG. 32 is a perspective view showing the state that the magnet 46 is mounted in the main gear 41. FIG. 33 is an exploded perspective view showing a way of mounting the magnet 46 in the main gear 41. FIG. 34 is a front view of a retaining plate 67.

As shown in FIG. 34, the retaining plate 67 is formed in an almost square shape as a whole, and made of elastically-deformable non-magnetic metal. An outer portion 67b of the retaining plate 67 includes four elastically deformable vane portions 67e. Each vane portion 67e is formed in a tongue-like shape, and formed inside with a mounting hole 67d. The retaining plate 67 is formed with a center opening 67c in a center portion 67a which is configured to press the magnet 46. The retaining plate 67 is formed with four hook portions 67f, each of the hook portions 67f being located between the adjacent vane portions 67e of the outer portion 67b. Each of the hook portions 67f is bent at right angle toward the magnet 46 and further folded inwardly at its distal end.

As shown in FIG. 33, an end face of the main gear 41 is provided with a plurality of mounting pins 41c protruding in correspondence with each mounting hole 67d of the retaining plate 67. In the sixth embodiment, the sunken portion 41f shown in FIG. 10 and others is not provided in portions where the mounting pins 41c are arranged. Moreover, in this embodiment, the height of each of the ribs 41d and 41e is made lower than the height of the ribs 41d and 41e shown in FIG. 28 so that each hook portion 67f of the retaining plate 67 does not interfere with the corresponding ribs 41d and 41e formed on the recessed part 41a of the main gear 41.

As shown in FIG. 33, the magnet 46 is inserted in the recessed part 41a such that a part of the magnet 46 protrudes from an upper end of the recessed part 41a of the main gear 41. Then, as shown in FIGS. 30 to 33, the magnet 46 inserted in the recessed part 41a is pressed against the main gear 41 by elastically deforming the vane portions 67e of the retaining plate 67, and each mounting pin 41c is inserted in the mounting holes 67d of the vane portions 67e. Each mounting pin 41c is thermally caulked and thereby the magnet 46 is secured to the main gear 41. Further, when the magnet 46 is pressed to the retaining plate 67, the folded distal ends of the hook portions 67f are press-contacted with the peripheral surface of the magnet 46.

According to the rotation angle detection apparatus of the sixth embodiment, the magnet 46 inserted in the recessed part 41a of the main gear 41 is pressed to the main gear 41 by the elastic force of the retaining plate 67. Therefore, the magnet 46 can be held in the main gear 41 with a simple structure without wobbling in the axial and radial directions.

Further, according to the sixth embodiment, the folded distal end of each of the hook portions 67f is in press-contact with the peripheral surface of the magnet 46, and thereby the peripheral surface of the magnet 46 are firmly held by the plurality of the hook portions 67f. Accordingly, the movement of the magnet 46 in the main gear 41 in the radial direction can be further surely restricted, further enhancing the retaining force of the magnet 46 in the fixed position.

The present invention is not limited to the above embodiments and may be embodied as below without departing from the scope of its subject matter.

(1) In the above first embodiment, the retaining plate 47 is formed of spring material such as stainless steel or phosphor bronze, and the center portion 47a has skidproof effect on its surface by providing the rubber member 53 on the center portion 47a. As an alternate, the retaining plate may be made of rubber material to have the skidproof effect, or the retaining plate made of metal may have the file-processed surface to have the skidproof effect.

(2) In each of the above embodiments, only the surfaces of the center portions 47a and 57a of the retaining plates 47 and 57 are applied with a work for skidproof effect, but alternatively, overall the surface of the retaining plate may be applied with the skidproof work.

(3) In each of the above embodiments, the rotation angle detection apparatus of the present invention is embodied as an EGR valve, but alternatively, this rotation angle detection apparatus may be embodied as an electronic throttle valve provided in an intake passage of an engine.

INDUSTRIAL APPLICABILITY

This invention may be utilized for detecting a rotation angle of a rotor configuring a device such as an EGR valve and an electronic throttle device.

REFERENCE SIGNS LIST

39 EGR opening-degree sensor (Magnetism detector)
41 Main gear (Rotor)
41a Recessed part
41c Mounting pin
41g Lock portion
46 Magnet
47 Retaining plate
47a Center portion
47b Outer portion
47d Mounting hole
47e Vane portion
47f Hook portion
57 Retaining plate
57a Center portion
57b Outer portion
57c Center opening
57d Mounting hole
57e Vane portion
57f Tongue piece
67 Retaining plate
67a Center portion
67b Outer portion
67c Center opening
67d Mounting hole
67e Vane portion
67f Hook portion

What is claimed is:

1. A rotation angle detection apparatus provided with: a rotor; a magnet retained in the rotor; and a magnetism detector positioned to face to the magnet, the rotation angle detection apparatus being configured to detect a rotation angle of the rotor in such a way that the magnet rotates integrally with the rotor and the magnetism detector detects changes in magnetic field of the magnet, wherein the rotor includes a bottomed recessed part and a plurality of mounting pins arranged in the recessed part, the magnet is inserted in the recessed part such that a part of the magnet protrudes from an upper end of the recessed part, the rotation angle detection apparatus includes an elastically deformable retaining plate made of non-magnetic material configured to press and hold the magnet inserted in the recessed part to the rotor, the retaining plate includes a center portion and an outer portion, the outer portion including a plurality of mounting holes in each of which the mounting pins are inserted, and the magnet inserted in the recessed part is pressed at an outer peripheral edge against the rotor by the elastically deformed retaining plate and each of the mounting pins inserted one in each of the mounting holes is thermally caulked so that the magnet is secured to the rotor.

2. The rotation angle detection apparatus according to claim 1, wherein the retaining plate presses the magnet with the center portion, and the outer portion includes a plurality of vane portions in correspondence with the mounting holes.

3. The rotation angle detection apparatus according to claim 2, wherein the retaining plate includes a plurality of elastically deformable hook portions configured to clamp and hold a peripheral surface of the magnet in a state that the retaining plate presses the magnet against the rotor.

4. The rotation angle detection apparatus according to claim 3, wherein the rotor is formed with a lock portion locking an outer edge of the outer portion of the retaining plate so as to restrict spring back of the outer portion.

5. The rotation angle detection apparatus according to claim 2, wherein the retaining plate is applied with a skidproof work at least on a surface of the center portion.

6. The rotation angle detection apparatus according to claim 5, wherein the rotor is formed with a lock portion locking an outer edge of the outer portion of the retaining plate so as to restrict spring back of the outer portion.

7. The rotation angle detection apparatus according to claim 2, wherein the rotor is formed with a lock portion locking an outer edge of the outer portion of the retaining plate so as to restrict spring back of the outer portion.

8. The rotation angle detection apparatus according to claim 2, wherein the retaining plate includes the center portion formed with a center opening and an inner periphery portion defining the center opening is split into a plurality of tongue pieces.

9. The rotation angle detection apparatus according to claim 1, wherein the retaining plate includes a plurality of elastically deformable hook portions configured to clamp and hold a peripheral surface of the magnet in a state that the retaining plate presses the magnet against the rotor.

10. The rotation angle detection apparatus according to claim 9, wherein the rotor is formed with a lock portion locking an outer edge of the outer portion of the retaining plate so as to restrict spring back of the outer portion.

11. The rotation angle detection apparatus according to claim 1, wherein the retaining plate is applied with a skidproof work at least on a surface of the center portion.

12. The rotation angle detection apparatus according to claim 11, wherein the rotor is formed with a lock portion locking an outer edge of the outer portion of the retaining plate so as to restrict spring back of the outer portion.

13. The rotation angle detection apparatus according to claim 1, wherein the rotor is formed with a lock portion locking an outer edge of the outer portion of the retaining plate so as to restrict spring back of the outer portion.

14. The rotation angle detection apparatus according to claim 1, wherein, the retaining plate is configured to press the magnet with the center portion formed with a center opening, and an inner periphery portion defining the center opening is split into a plurality of tongue pieces.

* * * * *